US009784191B2

(12) United States Patent
Sakai

(10) Patent No.: US 9,784,191 B2
(45) Date of Patent: Oct. 10, 2017

(54) INTERNAL COMBUSTION ENGINE

(71) Applicant: Kazuhito Sakai, Mishima (JP)

(72) Inventor: Kazuhito Sakai, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 231 days.

(21) Appl. No.: 14/435,502

(22) PCT Filed: Jan. 16, 2014

(86) PCT No.: PCT/IB2014/000037
§ 371 (c)(1),
(2) Date: Apr. 14, 2015

(87) PCT Pub. No.: WO2014/111796
PCT Pub. Date: Jul. 24, 2014

(65) Prior Publication Data
US 2015/0260110 A1   Sep. 17, 2015

(30) Foreign Application Priority Data

Jan. 16, 2013   (JP) ................. 2013-005669

(51) Int. Cl.
*F02D 15/04* (2006.01)
*F02B 75/04* (2006.01)
*F16D 41/08* (2006.01)

(52) U.S. Cl.
CPC ............ *F02D 15/04* (2013.01); *F02B 75/041* (2013.01); *F16D 41/088* (2013.01)

(58) Field of Classification Search
CPC ...... F02D 15/04; F02B 75/041; F16D 41/088; F16D 41/10; F16D 41/105
USPC ............................................. 123/48 R, 48 C
See application file for complete search history.

(56) References Cited

U.S. PATENT DOCUMENTS

| 2009/0101113 | A1* | 4/2009 | Kamiyama | ............ F02D 15/04 |
| | | | | 123/48 C |
| 2010/0132674 | A1* | 6/2010 | Akihisa | ................ F02B 75/041 |
| | | | | 123/48 C |
| 2011/0259673 | A1 | 10/2011 | Hayase et al. | |

FOREIGN PATENT DOCUMENTS

| JP | 2005-030234 A | 2/2005 |
| JP | 2005-214088 A | 8/2005 |
| JP | 2007-239520 A | 9/2007 |
| JP | 2006234034 A | 9/2007 |
| JP | 2010-112409 A | 5/2010 |
| JP | 2011-089632 A | 5/2011 |

(Continued)

*Primary Examiner* — Kevin A Lathers
(74) *Attorney, Agent, or Firm* — Andrews Kurth Kenyon LLP

(57) ABSTRACT

A variable compression ratio mechanism of an internal combustion engine includes an operation element, an input actuator, and a reverse input torque cutoff clutch. The reverse input torque cutoff clutch includes a fixed member, a movable member, clearance, a wedge member, and a moving device. A peripheral surface of the fixed member is formed such that the clearance is formed with: a rotation prevention area that prevents the movable member from rotating in a reverse input torque acting direction. When the movable member moves in the direction to change a mechanical compression ratio, the moving device moves the wedge member from the rotation prevention area to the rotation allowable area in an opposite direction and holds the wedge member in the rotation allowable area.

16 Claims, 33 Drawing Sheets

(56) References Cited

FOREIGN PATENT DOCUMENTS

| JP | 2012-017820 A | 1/2012 |
|---|---|---|
| KR | 1020080108152 A | 12/2008 |

* cited by examiner

INTERNAL COMBUSTION ENGINE

CROSS-REFERENCE TO RELATED APPLICATIONS

This is a national phase application based on the PCT International Patent Application No. PCT/IB2014/000037 filed Jan. 16, 2014, claiming priority to Japanese Patent Application No. 2013-005669 filed Jan. 16, 2013, the entire contents of both of which are incorporated herein by reference.

BACKGROUND OF THE INVENTION

1. Field of the Invention

The present invention relates to an internal combustion engine.

2. Description of Related Art

A spark-ignited internal combustion engine has been known in which a variable compression ratio mechanism can change a mechanical compression ratio (see Japanese Patent Application Publication No. 2005-214088 (JP 2005-214088 A)). The variable compression ratio mechanism includes an operation element, an input actuator, and a reverse input torque cutoff clutch. The input actuator generates input torque for moving the operation element. The reverse input torque cutoff clutch is disposed between an output shaft of the input actuator and the operation element. The reverse input torque cutoff clutch is disposed to transmit the input torque from the input actuator to the operation element as well as to cut off the transmission of reverse input torque from the operation element to the input actuator. The variable compression ratio mechanism changes the mechanical compression ratio by the movement of the operation element. The reverse input torque cutoff clutch includes a fixed member, a movable member, clearance, a wedge member, and a moving member. The movable member is rotatable with respect to the fixed member. The clearance is defined by a peripheral surface of the fixed member and a peripheral surface of the movable member and is annular. The wedge member is movably disposed in the clearance. The moving member moves the wedge member in the clearance. The output shaft of the input actuator is connected to the movable member with clearance in a rotational direction thereof. The operation element is also connected to the movable member. The output shaft of the input actuator is connected to the moving member. The moving member moves in the clearance in a same direction as the rotational direction of the output shaft of the input actuator. The clearance is formed with a rotation prevention area and a rotation allowable area. The rotation prevention area is located on an upstream side of the rotation allowable area in a reverse input torque acting direction. The rotation prevention area prevents the movable member from rotating in the reverse input torque acting direction as the wedge member abuts against both of the fixed member and the movable member. The rotation allowable area allows the movable member to rotate in the reverse input torque acting direction. When the movable member moves in the reverse input torque acting direction to change the mechanical compression ratio, the input actuator first rotates in the reverse input torque acting direction. This causes the wedge member to move from the rotation prevention area to the rotation allowable area without rotating the movable member. Then, the input actuator further rotates in the reverse input torque acting direction. This causes the movable member to further rotate in the reverse input torque acting direction. Accordingly, the operation element moves to change the mechanical compression ratio.

In other words, the movable member is locked when the wedge member is in the rotation prevention area, and the movable member is unlocked when the wedge member moves to the rotation allowable area. In this case, a direction of the movement of the wedge member that is necessary to unlock the movable member is set to be the same as the reverse input torque acting direction in JP 2005-214088 A. The input actuator rotates the movable member to an angular position where a desired mechanical compression ratio can be obtained in a state that the movable member is unlocked.

The reverse input torque acts on the movable member as soon as the movable member is unlocked. Consequently, the reverse input torque causes the movable member to rotate with respect to the wedge member. Accordingly, the wedge member returns to locate in the rotation prevention area again. In other words, there is a possibility that the movable member is relocked. If the movable member is relocked, the movable member may not rotate smoothly, and thus the mechanical compression ratio may not be changed smoothly. In addition, there is a possibility of generating undesirable noise and vibration upon relocking.

SUMMARY OF THE INVENTION

An internal combustion engine according to one aspect of the present invention including a variable compression ratio mechanism that changes a mechanical compression ratio, in which the variable compression ratio mechanism includes: an operation element; an input actuator that generates input torque to move the operation element; and a reverse input torque cutoff clutch that is disposed between an output shaft of the input actuator and the operation element in order to transmit the input torque from the input actuator to the operation element and to cut off reverse input torque from the operation element to the input actuator, and the variable compression ratio mechanism changes the mechanical compression ratio by moving the operation element, and the reverse input torque cutoff clutch includes: a fixed member; a movable member that is rotatable with respect to the fixed member; annular clearance that is defined by a peripheral surface of the fixed member and a peripheral surface of the movable member; a wedge member that is movably disposed in the clearance; and a moving device that moves the wedge member in the clearance, the output shaft of the input actuator and the operation element are connected to the movable member, the peripheral surface of the fixed member is formed such that the clearance is formed with: a rotation prevention area that prevents the movable member from rotating in the reverse input torque acting direction when the wedge member abuts against the fixed member and the movable member; and a rotation allowable area that allows the movable member to rotate in the reverse input torque acting direction, the rotation prevention area is located on a downstream side of the rotation allowable area in the reverse input torque acting direction, and when the movable member moves in the reverse input torque acting direction to change the mechanical compression ratio, the moving device moves the wedge member from the rotation prevention area to the rotation allowable area in an opposite direction from the reverse input torque acting direction and holds the wedge member in the rotation allowable area, and the input actuator rotates the movable member in the reverse input torque acting direction.

In the internal combustion engine according to the aspect of the present invention, the moving device may return the wedge member from the rotation allowable area to the rotation prevention area after the movable member rotates in the reverse input torque acting direction.

In the internal combustion engine according to the aspect of the present invention, the moving device may include the input actuator, and the input actuator may move the wedge member from the rotation prevention area to the rotation allowable area.

In the internal combustion engine according to the aspect of the present invention, the moving device may further include a moving engaging device that engages the wedge member with the output shaft of the input actuator, and when the wedge member moves from the rotation prevention area to the rotation allowable area, the moving engaging device may engage the wedge member with the output shaft of the input actuator.

In the internal combustion engine according to the aspect of the present invention, the moving device may further include a holding engaging device that engages the wedge member with the fixed member, and when the wedge member is held in the rotation allowable area, the holding engaging device may engage the wedge member with the fixed member.

In the internal combustion engine according to the aspect of the present invention, the moving device may further includes a urging member that urges the wedge member from the rotation allowable area to the rotation prevention area, and the urging member returns the wedge member from the rotation allowable area to the rotation prevention area after the movable member rotates in the reverse input torque acting direction.

In the internal combustion engine according to the aspect of the present invention, the moving device may further includes a moving engaging device that engages the wedge member with the output shaft of the input actuator, and when the wedge member moves from the rotation prevention area to the rotation allowable area, the moving engaging device engages the wedge member with the output shaft of the input actuator, the moving device further includes a holding engaging device that engages the wedge member with the fixed member, and when the wedge member is held in the rotation allowable area, the holding engaging device engages the wedge member with the fixed member, the moving device further includes a urging member that urges the wedge member from the rotation allowable area to the rotation prevention area, and the urging member returns the wedge member from the rotation allowable area to the rotation prevention area after the movable member rotates in the reverse input torque acting direction, and the moving engaging device engages the wedge member with the output shaft of the input actuator and the holding engaging device engages the wedge member with the fixed member when the wedge member has not returned from the rotation allowable area to the rotation prevention area, and the moving device prevents the rotation of the movable member to maintain the mechanical compression ratio.

In the internal combustion engine according to the aspect of the present invention, the output shaft of the input actuator may be connected to the movable member with clearance in a rotational direction, and the input actuator may move the wedge member from the rotation prevention area to the rotation allowable area without rotating the movable member in an opposite direction from the reverse input torque acting direction.

In the internal combustion engine according to the aspect of the present invention, the moving device may further include the moving actuator, and the moving actuator may move the wedge member from the rotation prevention area to the rotation allowable area.

In the internal combustion engine according to the aspect of the present invention, the moving actuator may hold the wedge member in the rotation allowable area.

In the internal combustion engine according to the aspect of the present invention, the moving device further includes a urging member that urges the wedge member from the rotation allowable area to the rotation prevention area, and the urging member returns the wedge member from the rotation allowable area to the rotation prevention area after the movable member rotates in the reverse input torque acting direction.

In the internal combustion engine according to the aspect of the present invention, the moving actuator returns the wedge member from the rotation allowable area to the rotation prevention area after the movable member rotates in the reverse input torque acting direction.

In the internal combustion engine according to the aspect of the present invention, the moving device may stop torque input from the input actuator after the wedge member returns from the rotation allowable area to the rotation prevention area.

In the internal combustion engine according to the aspect of the present invention, when the torque input from the input actuator is stopped, the input torque from the input actuator may gradually be reduced.

In the internal combustion engine according to the aspect of the present invention, a reduction rate of the input torque from the input actuator may be changed according to a rate of change of the mechanical compression ratio.

In the internal combustion engine according to the aspect of the present invention, reduction rate of the input torque from the input actuator may be changed according to the reverse input torque that acts on the movable member.

In the internal combustion engine according to the aspect of the present invention, the urging member may be a spring.

In the internal combustion engine according to the aspect of the present invention, it is possible to change the mechanical compression ratio smoothly and to prevent unfavorable noise and vibration from generating when the mechanical compression ratio is changed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
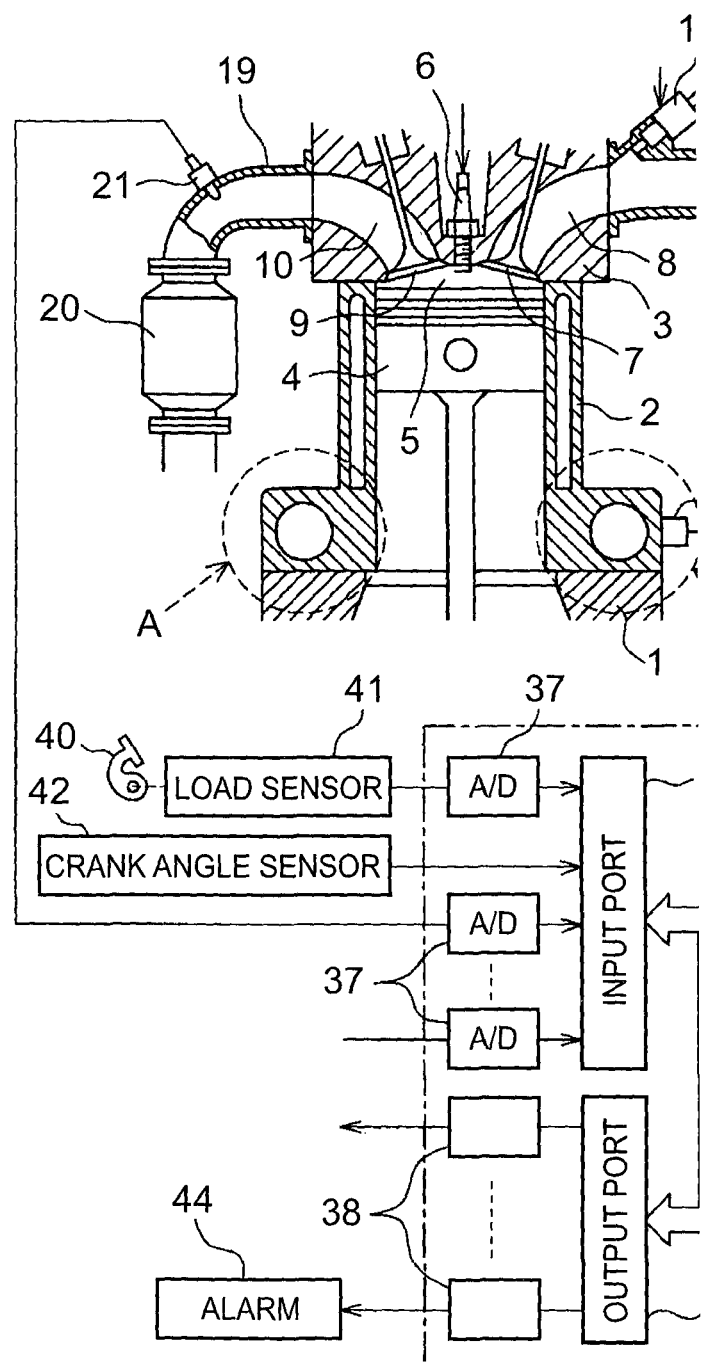
FIG. 1 is an overall view of a spark-ignited internal combustion engine.

FIG. 1 shows a case where the present invention is adopted for a spark-ignited internal combustion engine. The present invention can also be adopted for a compression ignition internal combustion engine.

FIG. 1 shows a crankcase 1, a cylinder block 2, a cylinder head 3, a piston 4, a combustion chamber 5, an ignition plug 6, an intake valve 7, an intake port 8, an exhaust valve 9, and an exhaust port 10. The ignition plug 6 is disposed at the center of a top surface of the combustion chamber 5. The intake port 8 is connected to a surge tank 12 via an intake branch pipe 11. A fuel injection valve 13 for injecting a fuel into the corresponding intake port 8 is disposed in the each intake branch pipe 11. It should be noted that the fuel injection valve 13 may be disposed in the each combustion chamber 5 instead of being attached to the each intake branch pipe 11.

The surge tank 12 is connected to an air cleaner 15 via an intake duct 14. A throttle valve 17 and an intake air amount detector 18 are disposed in the intake duct 14. The throttle valve 17 is driven by an actuator 16 for driving the throttle valve. The intake air amount detector 18 uses a hot wire, for example. Meanwhile, the exhaust port 10 is connected to a catalytic converter 20 via an exhaust manifold 19. The catalytic converter 20 houses a three-way catalyst, for example. An air-fuel ratio sensor 21 is disposed in the exhaust manifold 19.

In an embodiment shown in FIG. 1, a variable compression ratio mechanism A is disposed in a connecting section between the crankcase 1 and the cylinder block 2. The variable compression ratio mechanism A can change a mechanical compression ratio of the internal combustion engine by changing a relative position between the crankcase 1 and the cylinder block 2 in a cylinder axis direction. Here, if a volume of the combustion chamber when the piston is located at the compression top dead center is referred to as a combustion chamber volume, the mechanical compression ratio is a value that is mechanically defined by a stroke volume of the piston and the combustion chamber volume during a compression stroke, and is represented by (combustion chamber volume+stroke volume)/(combustion chamber volume).

An electronic control unit 30 includes a digital computer. The electronic control unit 30 is provided with a ROM (read only memory) 32, a RAM (random access memory) 33, a CPU (microprocessor) 34, an input port 35, and an output port 36. The ROM 32, RAM 33, CPU 34, the input port 35, and the output port 36 are connected to each other by a bidirectional bus 31. The input port 35 receives an output signal of the intake air amount detector 18 and an output signal of the air-fuel ratio sensor 21 via corresponding A/D converters 37. A load sensor 41 is connected to an accelerator pedal 40. The load sensor 41 generates an output voltage that is proportional to an operation amount L of the accelerator pedal 40. The input port 35 receives the output voltage of the load sensor 41 via the corresponding A/D converter 37. Furthermore, a crank angle sensor 42 is connected to the input port 35. The crank angle sensor 42 generates an output pulse every time the crankshaft rotates by 30°, for example. Moreover, a position sensor 43 is provided to detect a relative position of the cylinder block 2 to the crankcase 1, and the input port 35 receives the output voltage of the position sensor 43 via the corresponding A/D converter 37. The relative position of the cylinder block 2 to the crankcase 1 is associated with the mechanical compression ratio. Meanwhile, the output port 36 is connected to the ignition plug 6, the fuel injection valve 13, the actuator 16 for driving the throttle valve, the variable compression ratio mechanism A, and an alarm 44 via corresponding drive circuits 38. The alarm 44 includes a lamp, a buzzer, or the like to inform a vehicle driver of failure of the variable compression ratio mechanism A.

Figure 2:
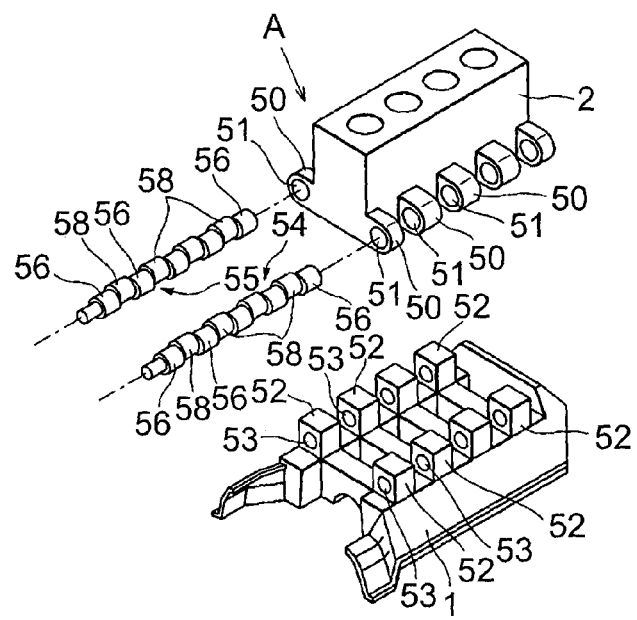
FIG. 2 is an exploded perspective view of a variable compression ratio mechanism.
Figure 3A:
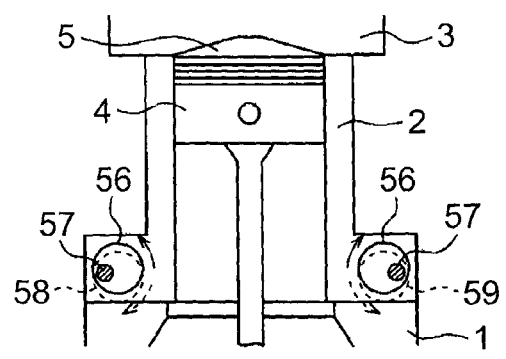
FIG. 3A and FIG. 3B are cross-sectional side views that illustrate the internal combustion engine.
Figure 3B:
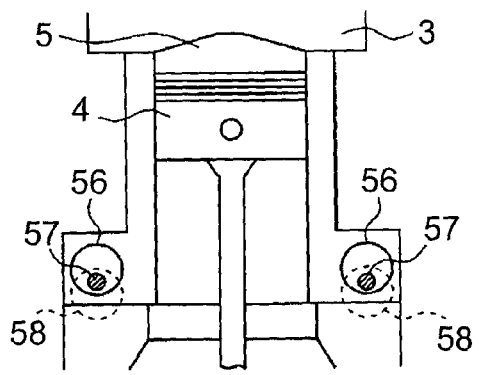

FIG. 2 is an exploded perspective view of the variable compression ratio mechanism A that is shown in FIG. 1. FIG. 3A and FIG. 3B are cross-sectional side views that illustrate the internal combustion engine. With reference to FIG. 2, plural projections 50 are formed at intervals on lower sides of both sidewalls of the cylinder block 2. A cam insertion hole 51 having a circular cross section is formed in each of the projections 50. Meanwhile, an upper wall surface of the crankcase 1 is formed with plural projections 52 at intervals, each of which fits between the corresponding projections 50. A cam insertion hole 53 having a circular cross section is also formed in each of the projections 52.

The variable compression ratio mechanism A includes an operation element. In the embodiment shown in FIG. 2, the operation element is formed of a pair of camshafts 54, 55. Circular cams 56 are alternately fixed on each of the camshafts 54, 55 and each thereof is rotatably inserted in each of the cam insertion holes 51. The circular cams 56 are coaxial with a rotational axis of each of the camshafts 54, 55. As shown by hatchings in FIG. 3A and FIG. 3B, an eccentric shaft 57 that is disposed eccentrically to the rotational axis of each of the camshafts 54, 55 extends between the circular cams 56. Another circular cams 58 are eccentrically and rotatably attached to the eccentric shaft 57. As shown in FIG. 2, each of the circular cams 58 is disposed between the circular cams 56. Each of the circular cams 58 is rotatably inserted in the corresponding cam insertion hole 53.

When the circular cam 56 that is fixed on each of the camshafts 54, 55 and that is in a state shown in FIG. 3A rotates in an opposite direction from each other as indicated by a solid arrow in FIG. 3A, the eccentric shaft 57 moves downward to the center. Consequently, in the cam insertion hole 53, the circular cam 58 rotates in an opposite direction from the circular cam 56 as indicated by a dashed arrow in FIG. 3A, and, when the eccentric shaft 57 reaches the center at the bottom as shown in FIG. 3B, the circular cam 58 moves such that a center thereof is located below the eccentric shaft 57.

As it can be understood from the comparison between FIG. 3A and FIG. 3B, the relative position between the crankcase 1 and the cylinder block 2 is determined by a distance between a center of the circular cam 56 and the center of the circular cam 58. With an increase in the distance between the center of the circular cam 56 and the center of the circular cam 58, the cylinder block 2 separates from the crankcase 1. As the cylinder block 2 separates from the crankcase 1, the combustion chamber volume increases. Accordingly, it is possible to change the combustion chamber volume or the mechanical compression ratio by rotating each of the camshafts 54, 55.

Figure 4:
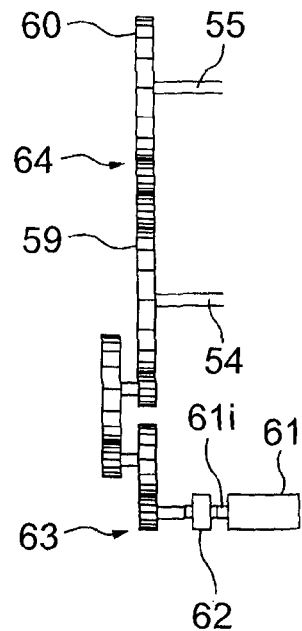
FIG. 4 is a partially enlarged view of the variable compression ratio mechanism.

As shown in FIG. 4, gears 59, 60 are respectively fixed to ends of the camshafts 54, 55. The variable compression ratio mechanism A further includes an input actuator 61. The input actuator 61 generates input torque for rotating the camshafts 54, 55. In the embodiment shown in FIG. 4, the input actuator 61 is configured of an electric motor. An output shaft 61*i* of the input actuator 61 is fitted to the gear 59 via a reverse input torque cutoff clutch 62 and a gear train 63. The gear 59 is fitted to the gear 60 via a gear train 64. Accordingly, when the input actuator 61 rotates, the camshafts 54, 55 rotate in an opposite direction. In this embodiment, it is possible to change the combustion chamber volume or the mechanical compression ratio in a wide range by driving the input actuator 61. It should be noted that the variable compression ratio mechanism A shown in FIG. 1 to FIG. 4 is merely one embodiment and that the present invention can use any type of the variable compression ratio mechanism. In the variable compression ratio mechanism in which the operation element performs a linear reciprocating motion, the operation element is connected to the reverse input torque cutoff clutch via a mechanism for converting the linear motion to a rotary motion.

The reverse input torque cutoff clutch 62 transmits the input torque from the input actuator 61 to the camshafts 54, 55 and cuts off transmission of reverse input torque from the camshafts 54, 55 to the input actuator 61. The reverse input torque is generated by combustion pressure and acts in a direction that the cylinder block 2 separates from the crankcase 1, that is, a direction to reduce the mechanical compression ratio in the embodiment shown in FIG. 1 to FIG. 4.

Figure 5:
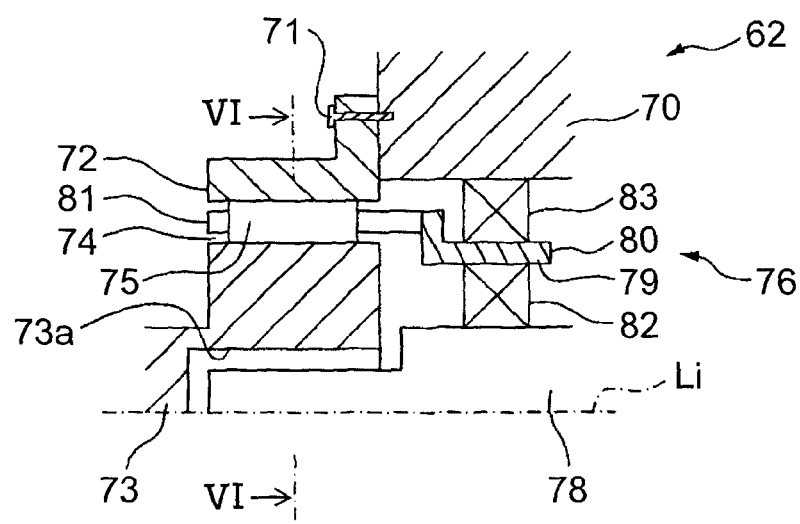
FIG. 5 is a partial cross-sectional view of a reverse input torque cutoff clutch.
Figure 6:
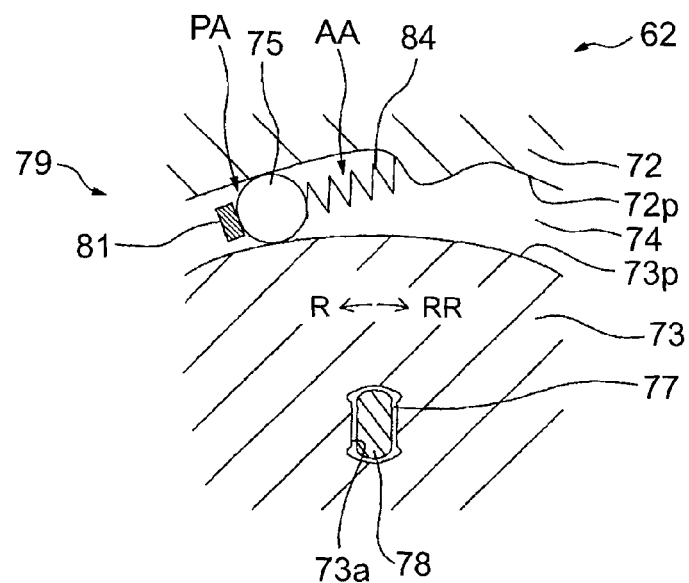
FIG. 6 is a partial cross-sectional view along the line XI-XI of FIG. 5.

As shown in FIG. 5 and FIG. 6, the reverse input torque cutoff clutch 62 includes a housing 70, a fixed member 72, a movable member 73, clearance 74, at least one wedge member 75, and a moving device 76. The housing 70 is fixed to a machine body 1, for example. The fixed member 72 is fixed to the housing 70 by a fixture 71 such as a bolt. The movable member 73 is rotatable about an axis Li with respect to the fixed member 72. The clearance 74 is defined by an inner peripheral surface 72*p* of the fixed member 72 and an outer peripheral surface 73*p* of the movable member 73, and is annular. The wedge member 75 is disposed in the clearance 74 in a movable manner. The moving device 76 moves the wedge member 75 in the clearance 74. In the embodiment shown in FIG. 5 and FIG. 6, the fixed member 72 is disposed on the outside while the movable member 73 is disposed on the inside.

The movable member 73 is formed with a housing hole 73*a*. An input rotary member 78 is housed in the housing hole 73*a* with clearance 77 in a circumferential direction of the movable member 73 or in a rotational direction of the movable member 73. The input rotary member 78 is held to be rotatable about the axis Li. The input actuator 61 is connected to the input rotary member 78. Accordingly, the movable member 73 and the input rotary member 78 are connected to each other with the clearance 77 in the rotational direction. Meanwhile, the gear train 63 is connected to the movable member 73. Accordingly, the camshafts 54, 55 are connected to the movable member 73.

As shown in FIG. 6, the outer peripheral surface 73*p* of the movable member 73 is formed to be a cylindrical surface. Meanwhile, the inner peripheral surface 72*p* of the fixed member 72 is formed such that a rotation prevention area PA and a rotation allowable area AA are adjacently formed in the rotational direction in the clearance 74. The inner peripheral surface 72p of the fixed member 72 is projected toward the movable member 73 in the rotation prevention area PA. In the rotation prevention area PA, a width of the clearance 74 in its radial direction is smaller than a diameter of the wedge member 75. As a result, the wedge member 75 abuts against both of the fixed member 72 and the movable member 73 to prevent the movable member 73 from moving in a reverse input torque acting direction R. On the other hand, in the rotation allowable area AA, the inner peripheral surface 72p of the fixed member 72 separates from the movable member 73, and the width of the clearance 74 in the radial direction is larger than the diameter of the wedge member 75. As a result, the movable member 73 is allowed to rotate in the reverse input torque acting direction R. Furthermore, the rotation prevention area PA is located on a downstream side of the rotation allowable area AA in the reverse input torque acting direction R.

The wedge member 75 is a cylindrical roller, four of which are provided at equally spaced intervals in a circumferential direction in the clearance 74.

In the embodiment shown in FIG. 5 and FIG. 6, the moving device 76 includes the input actuator 61 described above, the input rotary member 78, and a moving member 79. The moving member 79 abuts against and moves the wedge member 75. The moving member 79 includes an annular member 80 and a rod member 81. The annular member 80 is held to be rotatable about the axis Li. The rod member 81 is attached to the annular member 80. The rod member 81 is provided corresponding to the wedge member 75 and is disposed on the downstream side of the wedge member 75 in the reverse input torque acting direction R in the clearance 74. It should be noted that the movable member 73, the input rotary member 78, and the moving member 79 are coaxially disposed with each other.

The moving device 76 further includes a moving engaging device 82 that can engage the annular member 80 of the moving member 79 with the input rotary member 78. Once the moving engaging device 82 is operated, the annular member 80 is engaged with the input rotary member 78. Accordingly, the moving member 79 can rotate together with the input rotary member 78. When the operation of the moving engaging device 82 is stopped, the annular member 80 is disengaged from the input rotary member 78.

The moving device 76 further includes a holding engaging device 83 that can engage the annular member 80 with the housing 70. Once the holding engaging device 83 is operated, the annular member 80 is engaged with the housing 70. Accordingly, the moving member 79 cannot rotate. When the operation of the holding engaging device 83 is stopped, the annular member 80 is disengaged from the housing 70.

Figure 7A:
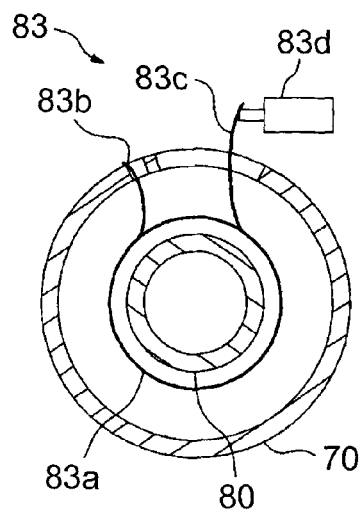
FIG. 7A and FIG. 7B are schematic views for showing an embodiment of a holding engaging device.
Figure 7B:
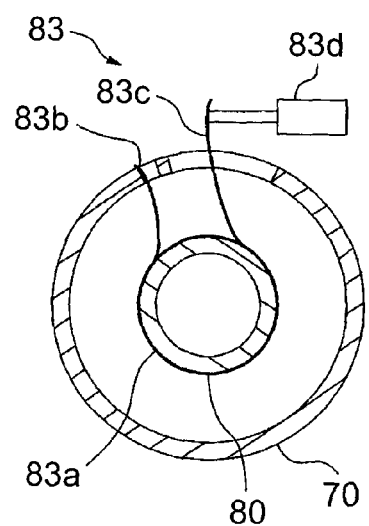

FIG. 7A and FIG. 7B show one embodiment of the holding engaging device 83. In the embodiment shown in FIG. 7A and FIG. 7B, the holding engaging device 83 includes a coil spring 83a that is disposed around the annular member 80 of the moving member 79. One end 83b of the coil spring 83a is fixed to the housing 70, and another end 83c of the coil spring 83a is connected to an extensible actuator 83d. When the operation of the actuator 83d is stopped, a diameter of the coil spring 83a is increased as shown in FIG. 7A. Consequently, the coil spring 83a is disengaged from the annular member 80. On the other hand, when the actuator 83d is operated, the diameter of the coil spring 83a is reduced as shown in FIG. 7B, and the coil spring 83a is engaged with the annular member 80. Accordingly, the annular member 80 is engaged with the housing 70.

Figure 8A:
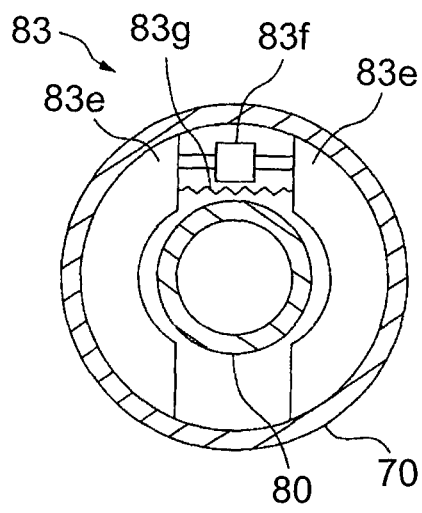
FIG. 8A and FIG. 8B are schematic views for showing another embodiment of the holding engaging device.
Figure 8B:
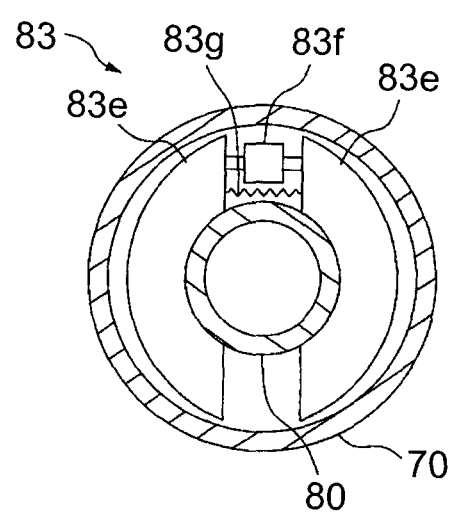

FIG. 8A and FIG. 8B show another embodiment of the holding engaging device 83. In the embodiment shown in FIG. 8A and FIG. 8B, the holding engaging device 83 includes a pair of drum shoes 83e that are attached to the housing 70 around the annular member 80 of the moving member 79. The drum shoes 83e are connected to each other by an extensible actuator 83f and a compression spring 83g. When the operation of the actuator 83f is stopped, the drum shoes 83e separate from each other as shown in FIG. 8A. Consequently, they are disengaged from the annular member 80. On the other hand, when the actuator 83f is operated, the drum shoes 83e approach each other and are engaged with the annular member 80 as shown in FIG. 8B. Consequently, the annular member 80 is engaged with the housing 70.

The moving engaging device 82 can have a same structure as the holding engaging device 83.

The moving device 76 further includes a compression spring 84 that urges the wedge member 75 from the rotation allowable area AA to the rotation prevention area PA. In the embodiment shown in FIG. 6, the compression spring 84 is disposed between the wedge member 75 and the fixed member 72.

Figure 9A:
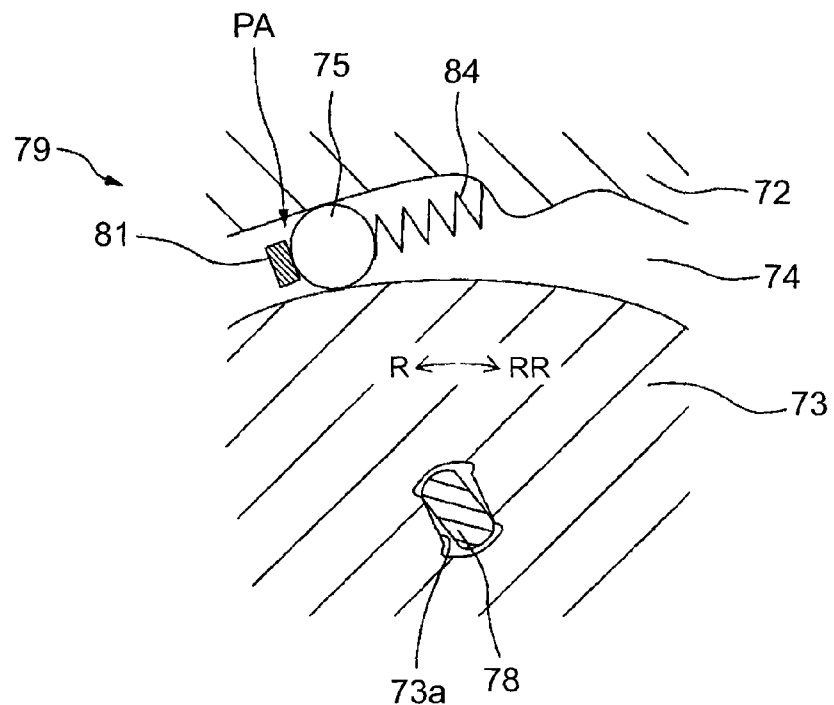
FIG. 9A and FIG. 9B are partial cross-sectional views and schematic views for illustrating mechanical compression ratio control.
Figure 9B:
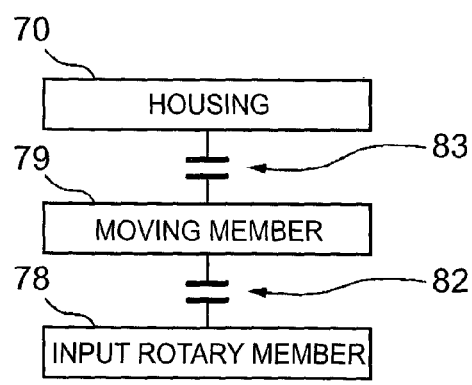

FIG. 9A and FIG. 9B show a state in which the mechanical compression ratio needs to be maintained. In this state, the operation of the moving engaging device 82 and that of the holding engaging device 83 are stopped. Accordingly, as shown in FIG. 9B, the moving member 79 is disengaged from both of the housing 70 and the input rotary member 78. Consequently, as shown in FIG. 9A, the wedge member 75 is retained in the rotation prevention area PA by the compression spring 84. Thus, even if the reverse input torque acts on the movable member 73 in the direction R, the movable member 73 is prevented from rotating. In other words, the reverse input torque from the camshafts 54, 55 to the input actuator 61 is cut off. Therefore, the mechanical compression ratio is maintained.

Figure 10A:
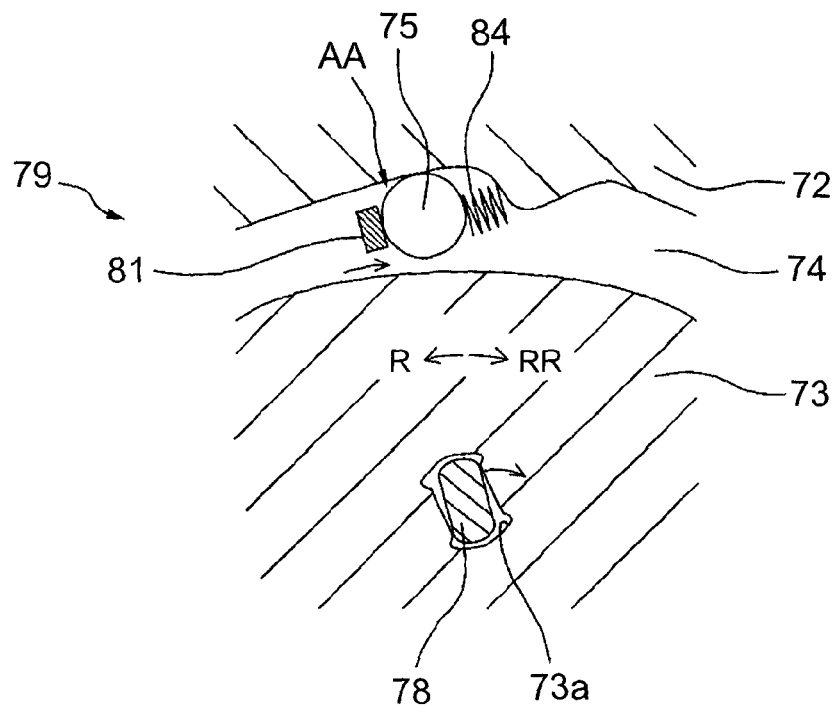
FIG. 10A and FIG. 10B are partial cross-sectional views and schematic views for illustrating the mechanical compression ratio control.
Figure 10B:
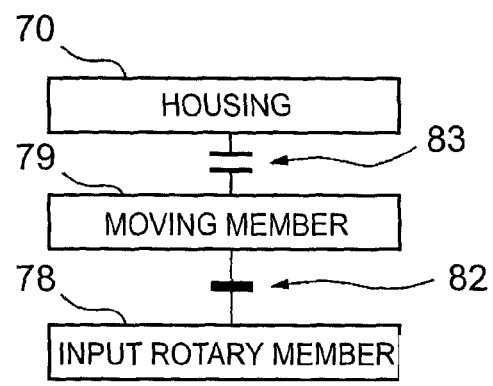

When the movable member 73 rotates in the reverse input torque acting direction R to reduce the mechanical compression ratio, the moving engaging device 82 is first operated while the holding engaging device 83 remains stopped. Accordingly, as shown in FIG. 10B, the moving member 79 is disengaged from the housing 70 and is engaged with the input rotary member 78. Next, the input actuator 61 is driven to rotate in a reverse direction RR that is opposite from the reverse input torque acting direction R. Accordingly, the input rotary member 78 rotates in the reverse direction RR. Consequently, the moving member 79 rotates in the reverse direction RR together with the input rotary member 78. Thus, as shown in FIG. 10A, the wedge member 75 moves from the rotation prevention area PA to the rotation allowable area AA in the reverse direction RR by the rod member 81 of the moving member 79. It should be noted that, because the clearance 77 (FIG. 6) is provided in the rotational direction between the movable member 73 and the input rotary member 78, the movable member 73 does not rotate in the reverse direction RR even when the input rotary member 78 rotates in the reverse direction RR. In addition, when the wedge member 75 moves to the rotation allowable area AA, the compression spring 84 is compressed.

Figure 11A:
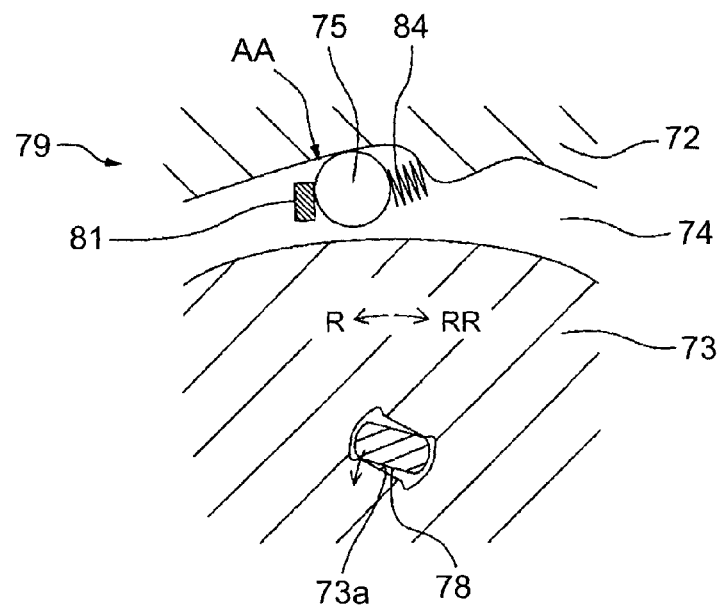
FIG. 11A and FIG. 11B are partial cross-sectional views and schematic views for illustrating the mechanical compression ratio control.
Figure 11B:
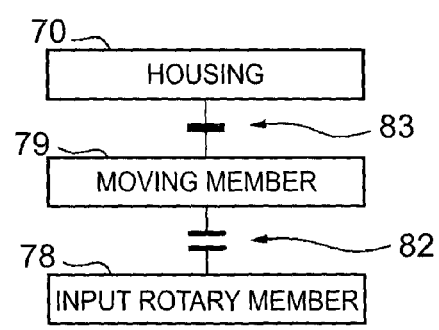

Once the wedge member 75 moves to the rotation allowable area AA, the operation of the moving engaging device 82 is stopped, and the holding engaging device 83 is operated. Accordingly, as shown in FIG. 11B, the moving member 79 is engaged with the housing 70 while being disengaged from the input rotary member 78. In other words, the moving member 79 is fixed. As a result, the wedge member 75 is held in the rotation allowable area AA by the moving member 79 and the compression spring 84.

In this state, the input actuator 61 is driven to rotate in the reverse input torque acting direction R. Accordingly, the movable member 73 rotates in the reverse input torque acting direction R. As a result, the camshafts 54, 55 (FIG. 2) rotate to change the mechanical compression ratio.

Because the wedge member 75 is held in the rotation allowable area AA at this time, the rotation of the movable member 73 or of the camshafts 54, 55 is not prevented. In other words, the mechanical compression ratio can be changed smoothly. In addition, because relocking does not occur, a problem of undesirable noise and vibration does not occur.

When the camshafts 54, 55 or the movable member 73 rotate to an angular position where the mechanical compression ratio reaches a target value, the operation of the input actuator 61 is stopped. In other words, energization to the input actuator 61 is stopped, and torque is stopped from being input from the input actuator 61 to the movable member 73. At the same time, the operation of the moving engaging device 82 and that of the holding engaging device 83 are also stopped. As a result, as shown in FIG. 9B, the moving member 79 is disengaged from both of the housing 70 and the input rotary member 78. Accordingly, as shown in FIG. 9A, the wedge member 75 returns from the rotation allowable area AA to the rotation prevention area PA in the reverse input torque acting direction R by a spring force of the compression spring 84. Thus, the rotation of the movable member 73 or the camshafts 54, 55 is prevented. Therefore, the mechanical compression ratio is maintained. It should be noted that the wedge member 75 pushes the moving member 79 to make it rotate in the direction R when the wedge member 75 returns from the rotation allowable area AA to the rotation prevention area PA.

Figure 13:
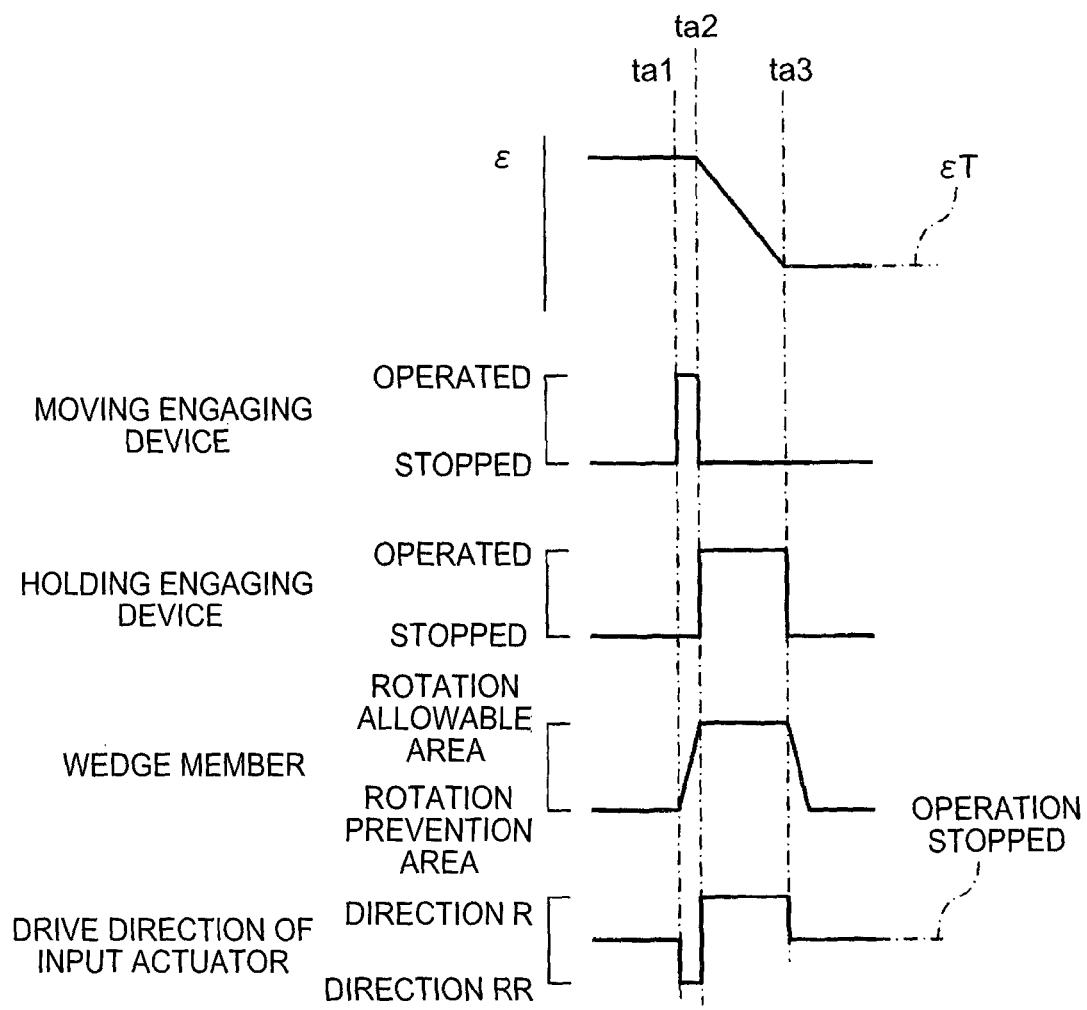
FIG. 13 is a timeline chart for describing the mechanical compression ratio control.

More specifically, when a mechanical compression ratio $\epsilon$ is reduced, the operation of the holding engaging device 83 remains stopped, the moving engaging device 82 is operated, and the input actuator 61 rotates in the reverse direction RR at a time ta1 that is shown in FIG. 13. Next, when the wedge member 75 moves to the rotation allowable area AA at a time ta2, the operation of the moving engaging device 82 is stopped, the holding engaging device 83 is operated, and the input actuator 61 rotates in the reverse input torque acting direction R. As a result, the mechanical compression ratio $\epsilon$ is reduced. Then, when the mechanical compression ratio $\epsilon$ reaches a target value $\epsilon T$ at a time ta3, the operation of the holding engaging device 83 is stopped, the rotation of the input actuator 61 is stopped, and the wedge member 75 returns to the rotation prevention area PA.

It can be understood that the wedge member 75 is temporarily engaged with the output shaft of the input actuator 61 by the moving engaging device 82 from the time ta1 to the time ta2. It can also be understood that the wedge member 75 is temporarily engaged with the fixed member 72 by the holding engaging device 83 from the time ta2 to the time ta3.

In other words, when the movable member 73 moves in the reverse input torque acting direction R to change the mechanical compression ratio, the moving device 76 moves the wedge member 75 from the rotation prevention area PA to the rotation allowable area AA in the opposite direction from the reverse input torque acting direction R and retains it in the rotation allowable area AA, and the input actuator 61 rotates the movable member 73 in the reverse input torque acting direction R. In addition, after the movable member 73 rotates in the reverse input torque acting direction R, the moving device 76 returns the wedge member 75 from the rotation allowable area AA to the rotation prevention area PA.

Figure 12A:
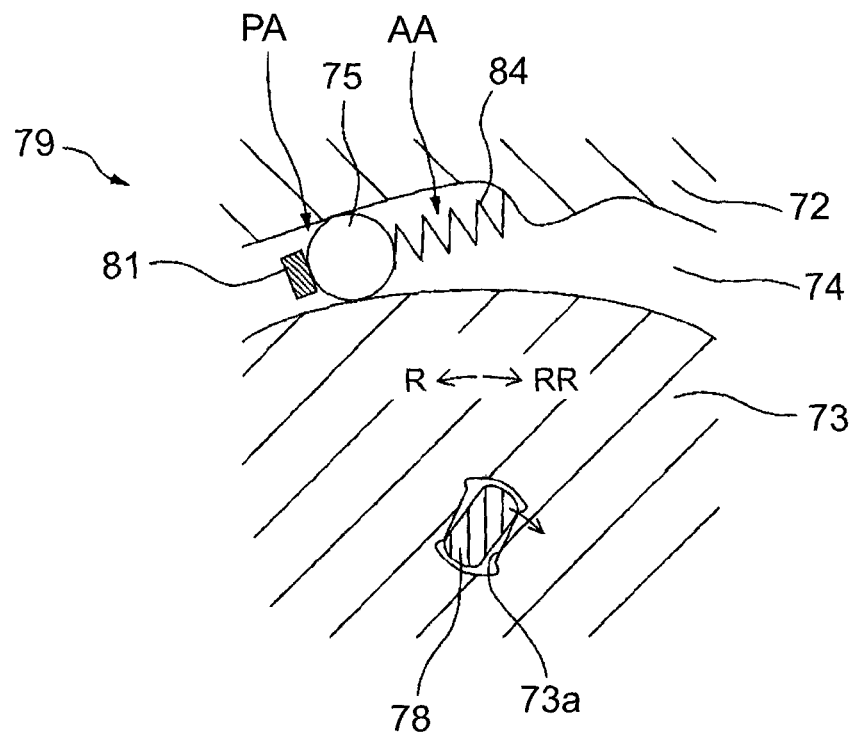
FIG. 12A and FIG. 12B are partial cross-sectional views and schematic views for illustrating the mechanical compression ratio control.
Figure 12B:
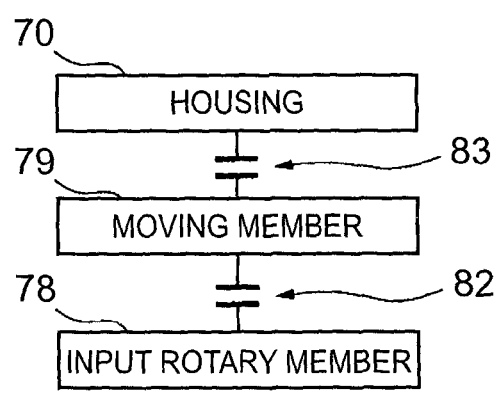

On the other hand, when the movable member 73 rotates in the reverse direction RR to increase the mechanical compression ratio, the operation of the moving engaging device 82 and that of the holding engaging device 83 remain stopped. Accordingly, as shown in FIG. 12B, the moving member 79 is disengaged from both of the housing 70 and the input rotary member 78. As a result, the wedge member 75 is held in the rotation prevention area PA. In this state, the input actuator 61 is driven to rotate in the reverse direction RR. Thus, the movable member 73 rotates in the reverse direction RR. As a result, the mechanical compression ratio is changed. In this case, the wedge member 75 slides or rolls on the movable member 73. Accordingly, even when the wedge member 75 is in the rotation prevention area PA, the movable member 73 can rotate in the reverse direction RR.

When the mechanical compression ratio does not change, the operation of the moving engaging device 82 and that of the holding engaging device 83 are stopped. Accordingly, the moving member 79 is disengaged from both of the housing 70 and the input rotary member 78. Thus, when engine vibration is large, for example, the moving member 79 may move unfavorably by the engine vibration. Considering this, when the engine vibration is large, the holding engaging device 83 may be temporarily operated to retain the moving member 79 by the housing 70. This can prevent the unfavorable movement of the moving member 79.

Figure 14:
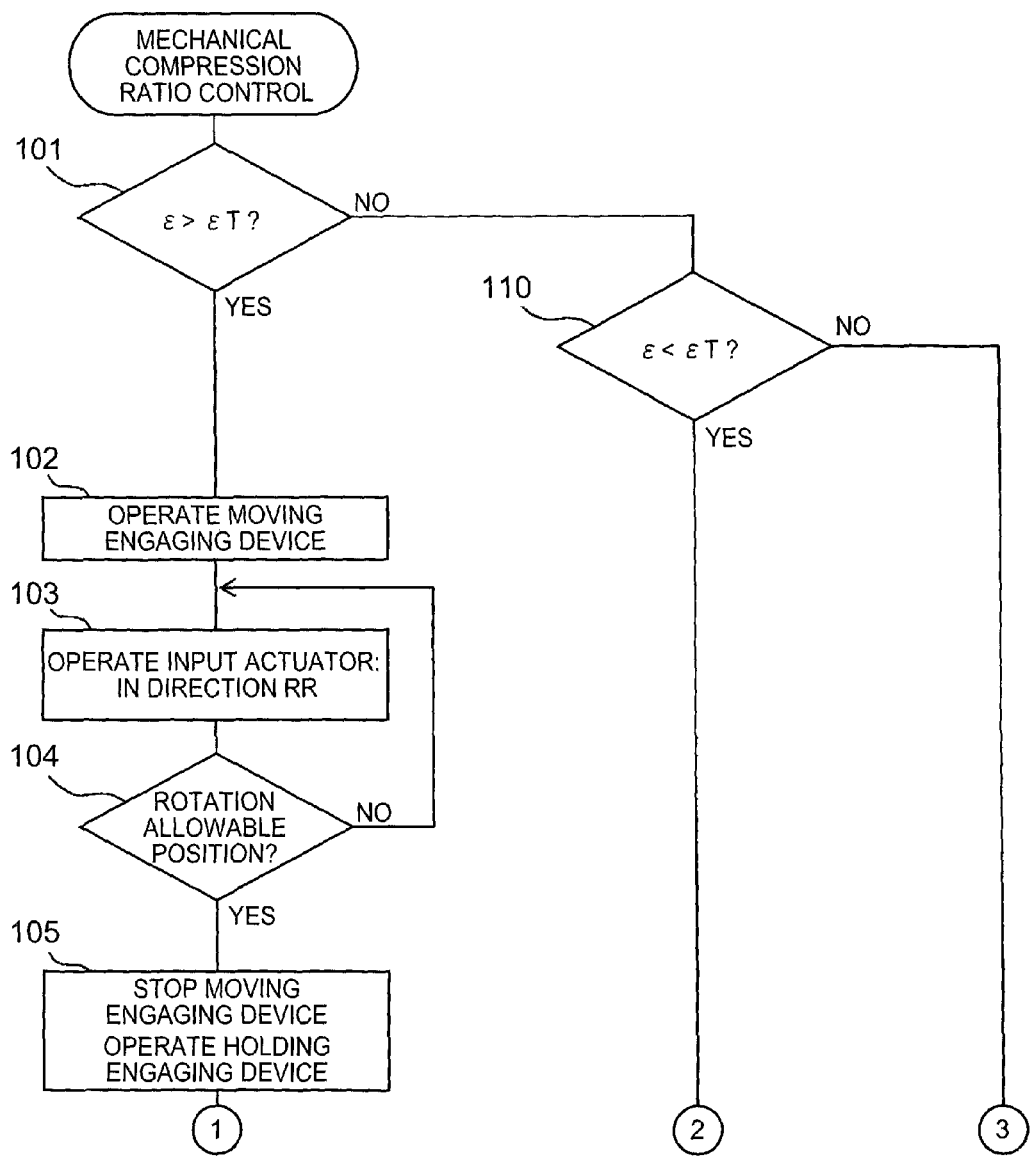
FIG. 14 is a flowchart for executing the mechanical compression ratio control.
Figure 15:
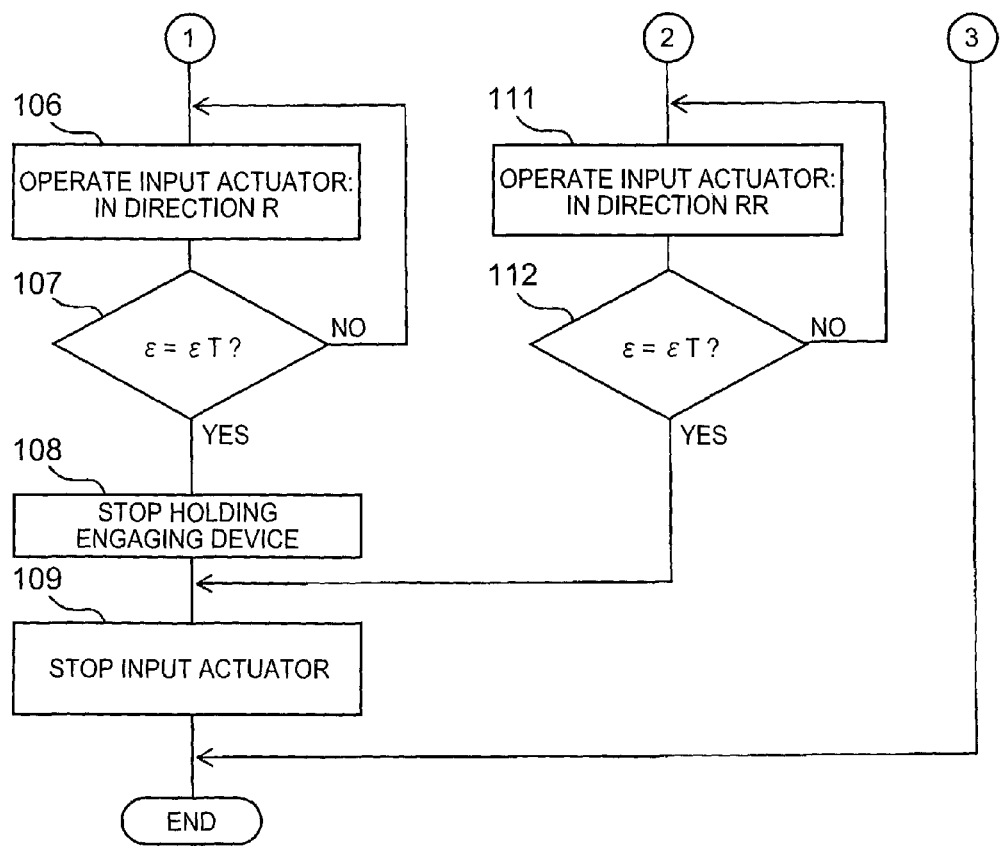
FIG. 15 is a flowchart for executing the mechanical compression ratio control.

FIG. 14 and FIG. 15 show a routine for executing the mechanical compression ratio control, which is described above.

With reference to FIG. 14 and FIG. 15, it is determined in a step 101 whether or not the current mechanical compression ratio $\epsilon$ is larger than the target value $\epsilon T$. If $\epsilon > \epsilon T$, that is, in order to reduce the mechanical compression ratio $\epsilon$, the process proceeds to a step 102. In the step 102, the moving engaging device 82 is operated. Then, in a next step 103, the input actuator 61 is operated such that the moving member 79 rotates in the reverse direction RR. In a next step 104, it is determined whether or not the wedge member 75 has moved to the rotation allowable area AA. If the wedge member 75 has not moved to the rotation allowable area AA, the process returns to the step 103. If the wedge member 75 has moved to the rotation allowable area AA, the process proceeds to a step 105. In the step 105, the operation of the moving engaging device 82 is stopped, and the holding engaging device 83 is operated. In a next step 106, the input actuator 61 is operated such that the movable member 73 rotates in the reverse input torque acting direction R. As a result, the mechanical compression ratio $\epsilon$ is reduced. In a next step 107, it is determined whether or not the current mechanical compression ratio $\epsilon$ becomes equal to the target value $\epsilon T$. If $\epsilon > \epsilon T$, the process returns to the step 106. If $\epsilon = \epsilon T$, the process proceeds to a step 108, and the operation of the holding engaging device 83 is stopped: In a next step 109, the operation of the input actuator 61 is stopped.

If $\epsilon > \epsilon T$ is not satisfied ($\epsilon \leq \epsilon T$) in the step 101, the process proceeds to a step 110. In the step 110, it is determined whether or not the current mechanical compression ratio $\epsilon$ is smaller than the target value $\epsilon T$. If $\epsilon < \epsilon T$, that is, in order to increase the mechanical compression ratio $\epsilon$, the process proceeds to a step 111. In the step 111, the input actuator 61 is operated such that the movable member 73 rotates in the reverse direction RR. In a next step 112, it is determined whether or not the current mechanical compression ratio $\epsilon$ becomes equal to the target value $\epsilon T$. If $\epsilon = \epsilon T$ is not satisfied ($\epsilon < \epsilon T$), the process returns to the step 111. If $\epsilon = \epsilon T$, the process proceeds to the step 109.

If $\epsilon < \epsilon T$ is not satisfied ($\epsilon = \epsilon T$) in the step 110, a processing cycle is terminated.

Whether or not the wedge member 75 has moved to the rotation allowable area AA is determined as follows, for example. In other words, the movement of the wedge member 75 in the reverse direction RR is restricted by the compression spring 84 and the fixed member 72. However, even when the wedge member 75 is restricted from moving in the reverse direction RR, the input actuator 61 keeps driven to attempt the movement of the wedge member 75 in the reverse direction RR. At this time, an energization amount to the input actuator 61 is increased. Accordingly, in the embodiment of the present invention, it can be determined that the wedge member 75 has moved to the rotation allowable area AA when the energization amount to the input actuator 61 exceeds a threshold value.

In another embodiment of the present invention, a rotational angle sensor is attached to the output shaft 61*i* of the input actuator 61, for example, and it is determined that the wedge member 75 has moved to the rotation allowable area AA when the output shaft 61*i* of the input actuator 61 rotates at an angle that is necessary for the wedge member 75 to move from the rotation prevention area PA to the rotation allowable area AA.

In addition, whether or not the current mechanical compression ratio $\epsilon$ becomes equal to the target value $\epsilon T$ is determined on the basis of the relative position of the cylinder block 2 to the crankcase 1 that is detected by the position sensor 43 (FIG. 1), for example. Meanwhile, the target value $\epsilon T$ is predetermined according to a mechanical operation state, for example.

Figure 16:
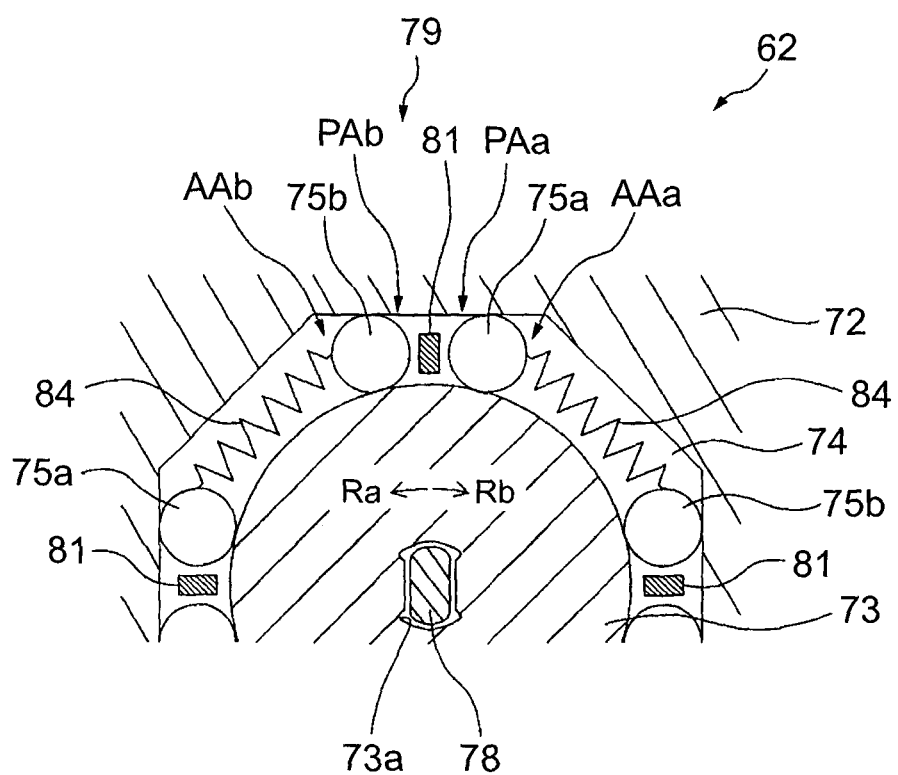
FIG. 16 is a partial cross-sectional view for showing another embodiment of the reverse input torque cutoff clutch.

FIG. 16 shows another embodiment of the reverse input torque cutoff clutch 62. A description will hereinafter be made on differences from the embodiment that is shown in FIG. 5 and FIG. 6.

In the embodiment shown in FIG. 16, a wedge member 75*a* and a wedge member 75*b* are disposed in the clearance 74. The wedge member 75*a* cuts off the reverse input torque that acts in a direction Ra by the combustion pressure. The wedge member 75*b* cuts off the reverse input torque that acts in a direction Rb by a weight of the cylinder block 2 and the like. The direction Ra and the direction Rb are opposite from each other. In the embodiment shown in FIG. 16, the wedge member 75*a* and the wedge member 75*b* are alternately disposed to separate from each other in the circumferential direction. The inner peripheral surface of the fixed member 72 is formed such that a rotation prevention area PAa and a rotation allowable area AAa for the wedge member 75*a* as well as a rotation prevention area PAb and a rotation allowable area AAb for the wedge member 75*b* are formed in the clearance 74. The rotation prevention area PAa is located on a downstream side of the rotation allowable area AAa in the direction Ra. The rotation prevention area PAb is located on a downstream side of the rotation allowable area AAb in the direction Rb. The compression spring 84 is disposed between the wedge member 75*a* and the wedge member 75*b* that is adjacent thereto on the upstream side in the direction Ra. In other words, the compression spring 84 is disposed between the wedge member 75*b* and the wedge member 75*a* that is adjacent thereto on the upstream side in the direction Rb. Furthermore, the rod member 81 of the moving member 79 that is shared by the wedge member 75*a* and the wedge member 75*b* is disposed on the downstream side of the wedge member 75*a* in the direction Ra or on the downstream side of the wedge member 75*b* in the direction Rb. It should be noted that the moving member for the wedge member 75*a* and the moving member for the wedge member 75*b* may separately be provided.

When the movable member 73 rotates in the direction Ra to change the mechanical compression ratio, the wedge member 75*a* moves to the rotation allowable area AAa by the rod member 81 and is held in the rotation allowable area AAa. Then, the input actuator 61 is driven to rotate the movable member 73 in the direction Ra. On the other hand, when the movable member 73 rotates in the direction Rb to change the mechanical compression ratio, the wedge member 75*b* moves to the rotation allowable area AAb by the rod member 81 of the moving member 79 and is held in the rotation allowable area AAb. Then, the input actuator 61 is driven to rotate the movable member 73 in the direction Rb. Accordingly, it is possible to smoothly change the mechanical compression ratio while cutting off the reverse input torque in the both directions.

Figure 17:
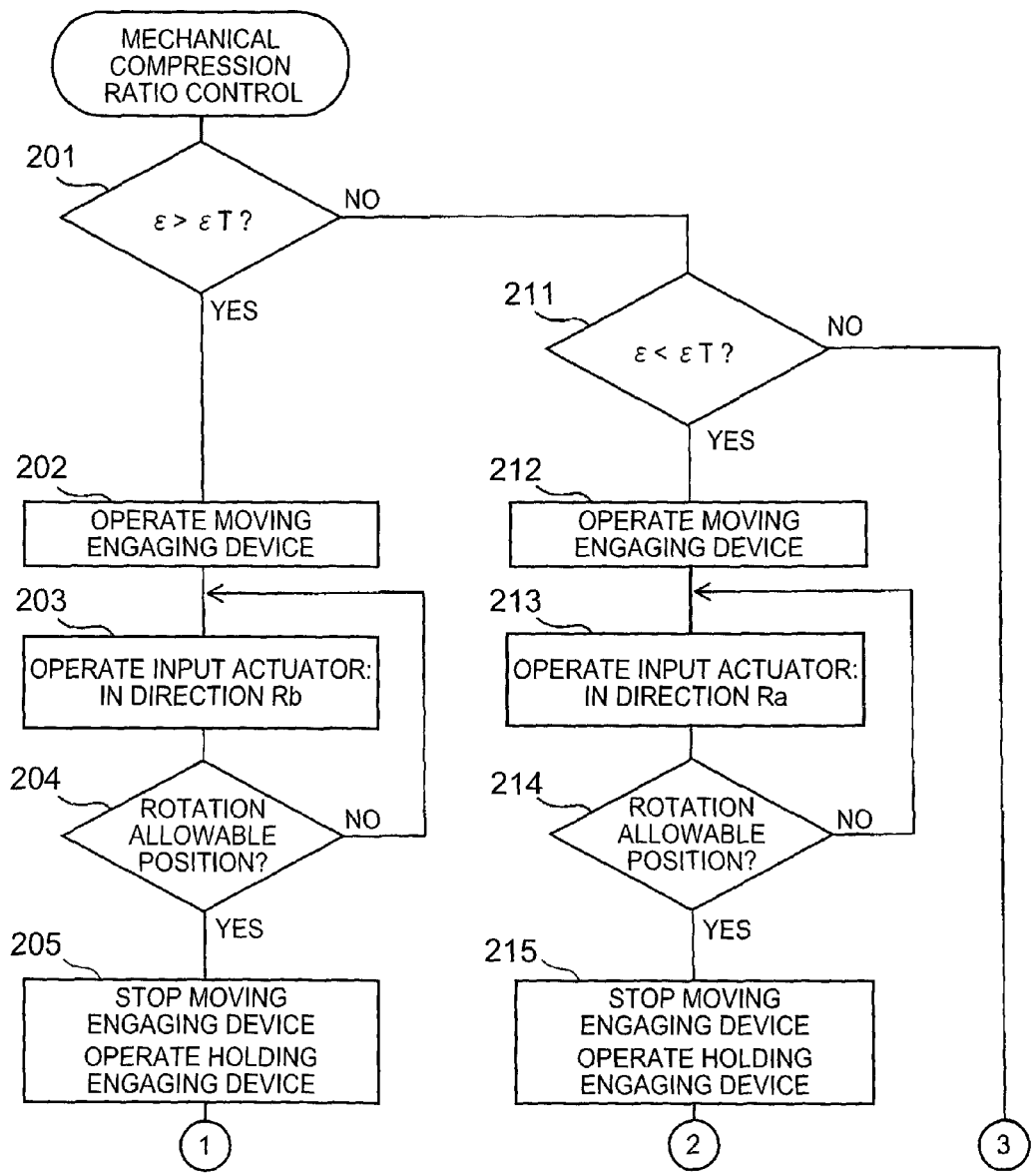
FIG. 17 is a flow chart for executing the mechanical compression ratio control in the embodiment shown in FIG. 16.
Figure 18:
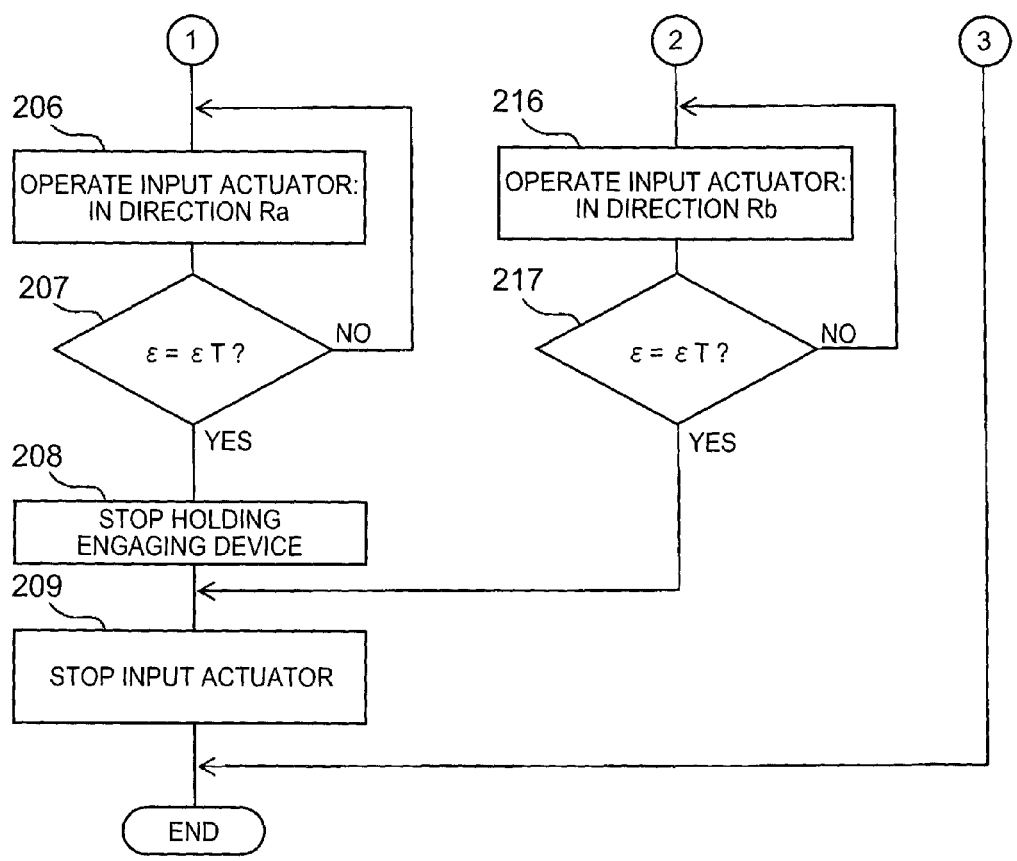
FIG. 18 is a flow chart for executing the mechanical compression ratio control in the embodiment shown in FIG. 16.

FIG. 17 and FIG. 18 show a routine for executing the mechanical compression ratio control in the embodiment that is shown in FIG. 16.

With reference to FIG. 17 and FIG. 18, it is determined in a step 201 whether or not the current mechanical compression ratio $\epsilon$ is larger than the target value $\epsilon T$. If $\epsilon > \epsilon T$, that is, in order to reduce the mechanical compression ratio $\epsilon$, process proceeds to a step 202. In the step 202, the moving engaging device 82 is operated. In a next step 203, the input actuator 61 is operated to rotate the moving member 79 in the direction Rb. In a next step 204, it is determined whether or not the wedge member 75*a* has moved the rotation allowable area AAa. If the wedge member 75*a* has not moved to the rotation allowable area AAa, the process returns to the step 203. If the wedge member 75*a* has moved to the rotation allowable area AAa, the process proceeds to a step 205. In the step 205, the operation of the moving engaging device 82 is stopped, and the holding engaging device 83 is operated. In a next step 206, the input actuator 61 is operated to rotate the movable member 73 in the direction Ra. As a result, the mechanical compression ratio $\epsilon$ is reduced. In a next step 207, it is determined whether or not the current mechanical compression ratio $\epsilon$ becomes equal to the target value $\epsilon T$. If $\epsilon > \epsilon T$, the process returns to the step 206. If $\epsilon = \epsilon T$, the process proceeds to a step 208. In the step 208, the operation of the holding engaging device 83 is stopped. In a next step 209, the operation of the input actuator 61 is stopped.

If $\epsilon > \epsilon T$ is not satisfied ($\epsilon \leq \epsilon T$) in the step 201, the process proceeds to a step 211. In the step 211, it is determined whether or not the current mechanical compression ratio $\epsilon$ is smaller than the target value $\epsilon T$. If $\epsilon < \epsilon T$, that is, in order to increase the mechanical compression ratio $\epsilon$, the process proceeds to a step 212. In the step 212, the moving engaging device 82 is operated. In a next step 213, the input actuator 61 is operated to rotate the moving member 79 in the direction Ra. In a next step 214, it is determined whether or not the wedge member 75*b* has moved to the rotation allowable area AAb. If the wedge member 75*b* has not moved to the rotation allowable area AAb, the process returns to the step 213. If the wedge member 75*b* has moved to the rotation allowable area AAb, the process proceeds to a step 215. In the step 215, the operation of the moving engaging device 82 is stopped, and the holding engaging device 83 is operated. In a next step 216, the input actuator 61 is operated to rotate the movable member 73 in the direction Rb. As a result, the mechanical compression ratio $\epsilon$ is increased. In a next step 217; it is determined whether or not the current mechanical compression ratio $\epsilon$ becomes equal to the target value $\epsilon T$. If $\epsilon = \epsilon T$ is not satisfied ($\epsilon < \epsilon T$), the process returns to the step 216. If $\epsilon = \epsilon T$, the process proceeds to the step 208.

If $\epsilon < \epsilon T$ is not satisfied ($\epsilon = \epsilon T$) in the step 211, the processing cycle is terminated.

Figure 19:
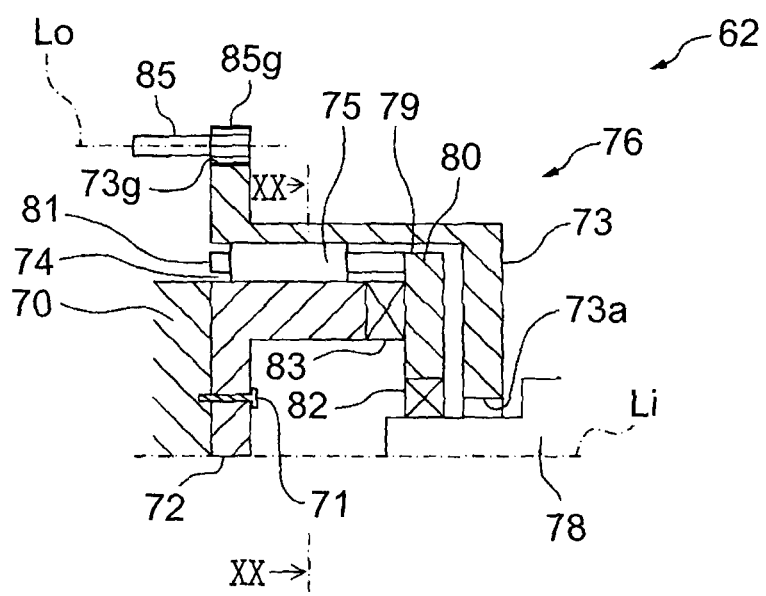
FIG. 19 is a partial cross-sectional view for showing another embodiment of the reverse input torque cutoff clutch.
Figure 20:
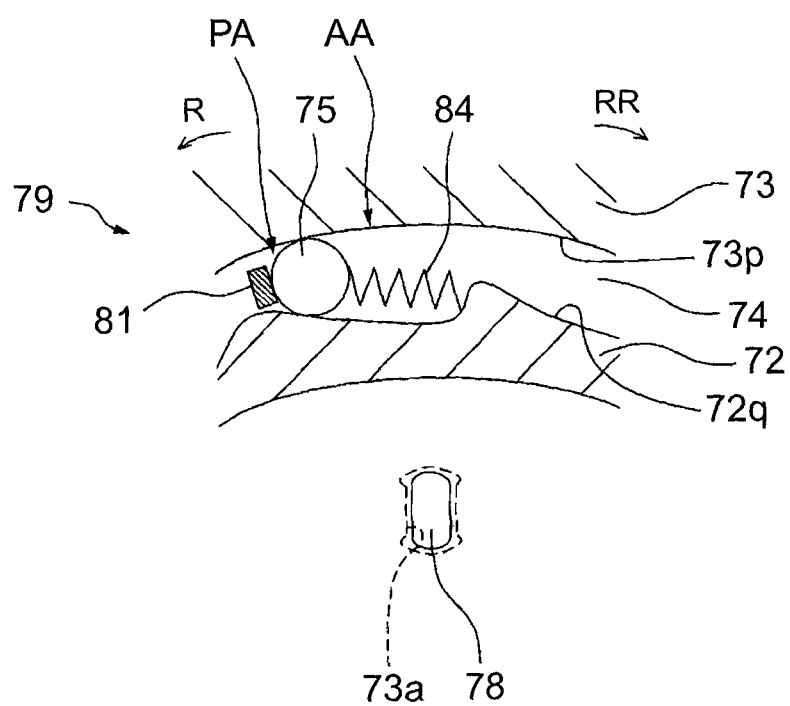
FIG. 20 is a partial cross-sectional view taken along the line XX-XX of FIG. 19.

FIG. 19 and FIG. 20 show yet another embodiment of the reverse input torque cutoff clutch 62. A description will hereinafter be made on differences from the embodiment shown in FIG. 5 and FIG. 6.

In the embodiment shown in FIG. 19 and FIG. 20, the fixed member 72 is disposed on the inside, and the movable member 73 is disposed on the outside. Accordingly, the clearance 74 is defined between an outer peripheral surface 72$q$ of the fixed member 72 and an inner peripheral surface 73$p$ of the movable member 73. The inner peripheral surface 73$p$ of the movable member 73 is formed to be a cylindrical surface. Meanwhile, the outer peripheral surface 72$q$ of the fixed member 72 is formed such that the rotation prevention area PA and the rotation allowable area AA are adjacently formed in the rotational direction in the clearance 74, and the rotation prevention area PA is located on the downstream side of the rotation allowable area AA in the reverse input torque acting direction R.

As shown in FIG. 19, a gear 73$g$ is formed on the outer peripheral surface of the movable member 73. Meanwhile, the moving device 76 further includes an output rotary member 85 that is held to be rotatable about an axis Lo. The output rotary member 85 is connected to the camshafts 54, 55 via the gear train 63. In addition, the output rotary member 85 is formed with a gear 85$g$. The gear 85$g$ meshes with the gear 73$g$ of the movable member 73. Thus, when the movable member 73 rotates about the axis Li, the output rotary member 85 also rotates about the axis Lo.

Figure 21:
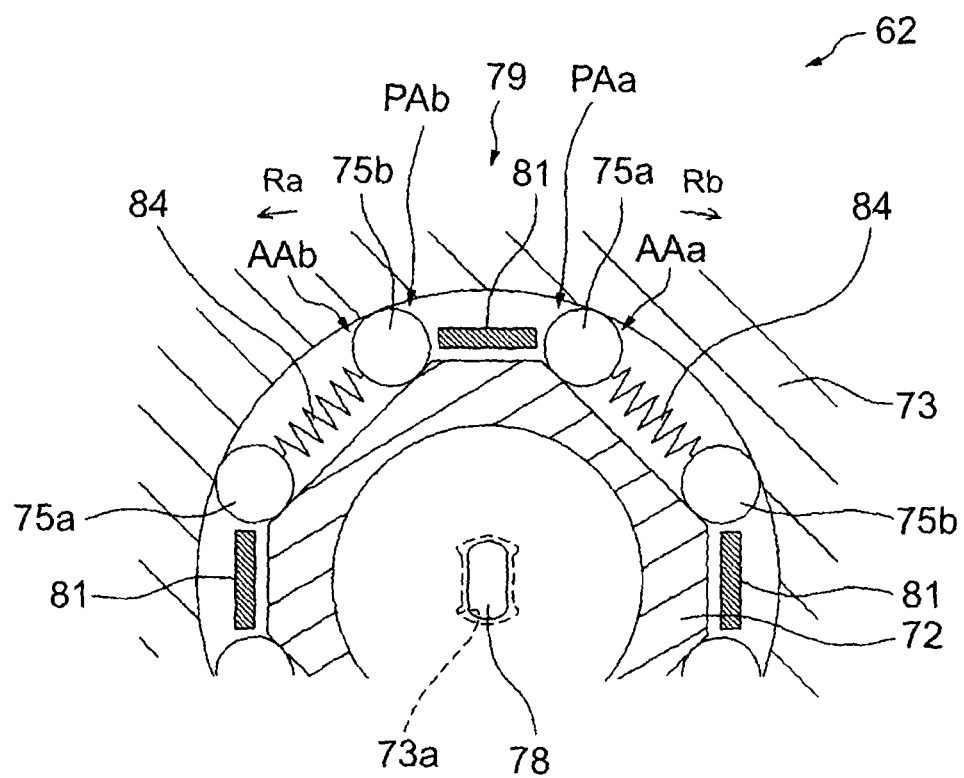
FIG. 21 is a partial cross-sectional view for showing yet another embodiment of the reverse input torque cutoff clutch.

FIG. 21 shows yet another embodiment of the reverse input torque cutoff clutch 62. A description will hereinafter be made on differences from the embodiment shown in FIG. 19 and FIG. 20.

In the embodiment shown in FIG. 21, the wedge member 75$a$ and the wedge member 75$b$ are disposed in the clearance 74. The wedge member 75$a$ cuts off the reverse input torque that acts in the direction Ra by the combustion pressure. The wedge member 75$b$ cuts off the reverse input torque that acts in the direction Rb by the weight of the cylinder block 2 and the like. The direction Ra and the direction Rb are opposite from each other. In the embodiment shown in FIG. 21, the wedge member 75$a$ and the wedge member 75$b$ are alternately disposed to separate from each other in the circumferential direction. The outer peripheral surface of the fixed member 72 is formed such that the rotation prevention area PAa and the rotation allowable area AAa for the wedge member 75$a$ as well as the rotation prevention area PAb and the rotation allowable area AAb for the wedge member 75$b$ are formed in the clearance 74. The rotation prevention area PAa is located on the downstream side of the rotation allowable area AAa in the direction Ra. The rotation prevention area PAb is located on the downstream side of the rotation allowable area AAb in the direction Rb. In addition, the compression spring 84 is disposed between the wedge member 75$a$ and the wedge member 75$b$ that is adjacent thereto on the upstream side in the direction Ra. In other words, the compression spring 84 is disposed between the wedge member 75$b$ and the wedge member 75$a$ that is adjacent thereto on the upstream side in the direction Rh. Furthermore, the rod member 81 of the moving member 79 that is shared by the wedge member 75$a$ and the wedge member 75$b$ is disposed on the downstream side of the wedge member 75$a$ in the direction Ra or on the downstream side of the wedge member 75$b$ in the direction Rb. It should be noted that the moving member for the wedge member 75$a$ and the moving member for the wedge member 75$b$ may separately be provided.

When the movable member 73 rotates in the direction Ra to change the mechanical compression ratio, the wedge member 75$a$ moves to the rotation allowable area AAa by the rod member 81 and is held in the rotation allowable area AAa. Then, the input actuator 61 is driven to rotate the movable member 73 in the direction Ra. On the other hand, when the movable member 73 rotates in the direction Rb to change the mechanical compression ratio, the wedge member 75$b$ moves to the rotation allowable area AAb by the rod member 81 of the moving member 79 and is held in the rotation allowable area AAb. Then, the input actuator 61 is driven to rotate the movable member 73 in the direction Rb. Therefore, it is possible to smoothly change the mechanical compression ratio while cutting off the reverse input torque in the both directions.

Next, with reference to FIG. 22, a description will be made on another embodiment of the operation stop control by the input actuator 61 in the embodiment that is shown in FIG. 5 and FIG. 6. It should be noted that this another embodiment of the operation stop control can also be adopted for the embodiment shown in FIG. 16, the embodiment shown in FIG. 19 and FIG. 20, and the embodiment shown in FIG. 21.

Figure 22:
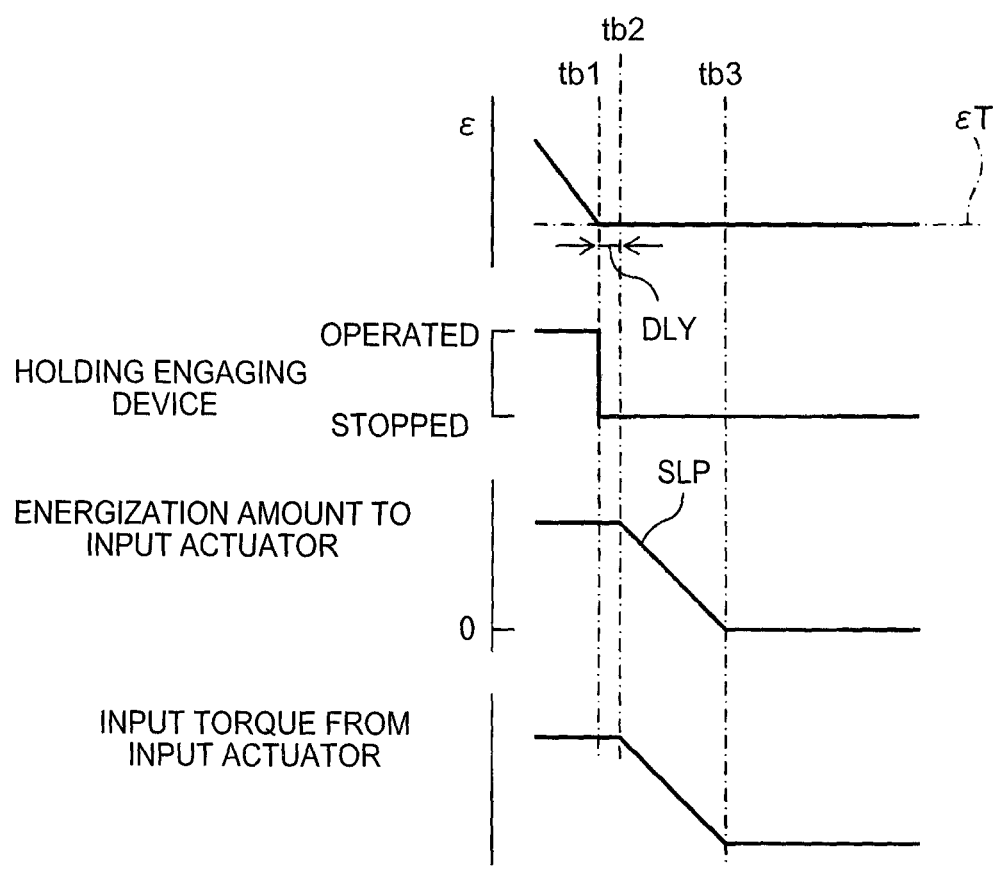
FIG. 22 is a timeline chart for describing another embodiment of operation stop control of an input actuator.

In the embodiment shown in FIG. 22, once the mechanical compression ratio $\epsilon$ reaches the target value $\epsilon T$ at a time tb1, the operation of the holding engaging device 83 is stopped. At this time, the operation of the input actuator 61 is not stopped, and the energization to the input actuator 61 continues. In other words, the input torque from the input actuator 61 is maintained. Next, after a delay time DLY elapses, that is, at a time tb2, the energization amount to the input actuator 61 is reduced. When the energization amount to the input actuator 61 is reduced, the energization amount to the input actuator 61 is gradually reduced with a gradient SLP ($<0$), and the input torque from the input actuator 61 is also gradually reduced in the embodiment shown in FIG. 22. Then, at a time tb3, the energization amount to the input actuator 61 becomes zero, and the torque input from the input actuator 61 is stopped.

Even when the operation of the holding engaging device 83 is stopped, the wedge member 75 does not reach the rotation prevention area PA immediately. In other words, the wedge member 75 remains in the rotation allowable area AA for a certain time period even after the operation of the holding engaging device 83 is stopped. Meanwhile, when the operation of the input actuator 61 is stopped, the torque in the direction R that acts on the movable member 73 increases. Accordingly, if the operation of the holding engaging device 83 and the operation of the input actuator 61 are simultaneously stopped, there is a possibility that the movable member 73 rotates in the direction R (FIG. 6) and that the mechanical compression ratio deviates from the target value. Thus, in the embodiment shown in FIG. 22, the delay time DLY described above is set in advance to be longer than a time period that is necessary for the wedge member 75 to return to the rotation prevention area PA after the operation of the holding engaging device 83 is stopped. Based on this, the energization amount to the input actuator 61 is maintained until the delay time DLY elapses after the operation of the holding engaging device 83 is stopped, and the energization amount of the input actuator 61 is reduced after the lapse of the delay time DLY. As a result, the unfavorable rotation of the movable member 73 is prevented, and the mechanical compression ratio is maintained at the target value.

On the other hand, if the energization amount to the input actuator 61 is reduced in a step manner, the input torque from the input actuator is reduced abruptly, and the input torque in the direction R that acts on the movable member 73 is increased abruptly. This may cause the generation of unfavorable vibration or noise. Thus, in the embodiment shown in FIG. 22, the energization amount to the input actuator 61 is gradually reduced, and the input torque from the input actuator 61 is also gradually reduced. As a result, the input torque in the direction R that acts on the movable member 73 is gradually increased, and vibration or noise that may be generated during the operation stop of the input actuator 61 is prevented.

Accordingly, in the embodiment shown in FIG. 22, the torque input from the input actuator 61 is stopped after the moving device 76 returns the wedge member 75 from the rotation allowable area AA to the rotation prevention area PA. In addition, when the torque input from the input actuator 61 is stopped, the input torque from the input actuator 61 is gradually reduced.

Figure 23:
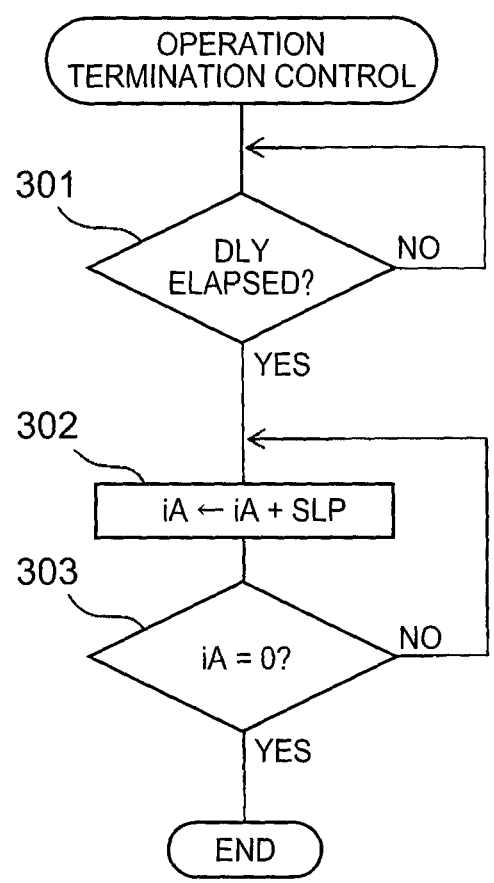
FIG. 23 is a flowchart for executing the operation stop control shown in FIG. 22.

FIG. 23 shows a routine for executing the operation stop control of the input actuator 61 that is shown in FIG. 22. It should be noted that the routine is executed in the step 109 of FIG. 15, for example. The step 109 is executed by following the step 108 in which the operation of the holding engaging device 83 is stopped.

With reference to FIG. 23, it is determined in a step 301 whether or not the delay time DLY has elapsed since the operation of the holding engaging device 83 is stopped. If the delay time DLY has not elapsed, the process returns to the step 301. If the delay time DLY has elapsed, the process proceeds to a step 302. In the step 302, an energization amount iA to the input actuator 61 is updated. When the energization amount iA is updated, the energization amount iA is reduced as the gradient SLP is a negative value. In a next step 303, it is determined whether or not the energization amount iA becomes zero. If iA>0, the process returns to the step 302, and if iA=0, the processing cycle is terminated.

Next, a description will be made on yet another embodiment of the operation stop control of the input actuator 61 in the embodiment that is shown in FIG. 5 and FIG. 6. It should be noted that this yet another embodiment of the operation stop control can also be adopted for the embodiment shown in FIG. 16, the embodiment shown in FIG. 19 and FIG. 20, and the embodiment shown in FIG. 21.

Figure 24:
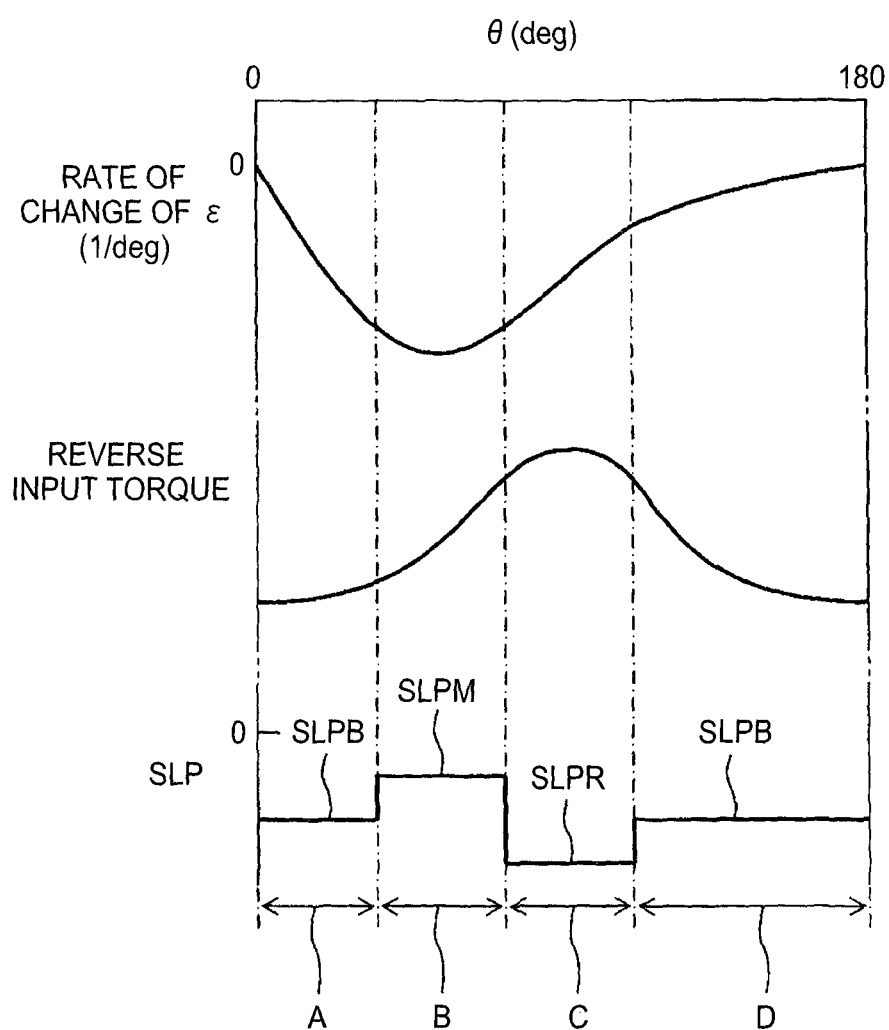
FIG. 24 is a diagrammatic view for showing a change in a change ratio of the mechanical compression ratio and the like in response to a change in a link angle.
Figure 25:
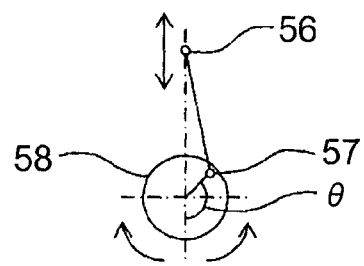
FIG. 25 is a view for illustrating the link angle.

FIG. 24 shows a rate of change of the mechanical compression ratio $\epsilon$ and a change in the reverse input torque when a link angle $\theta$ of a link that is formed by the circular cams 56, 58 of the camshafts 54, 55 and the eccentric shaft 57 (FIG. 2) is increased from 0 degree to 180 degrees. Here, as shown in FIG. 25, the link angle $\theta$ is an angle formed by an axis of movement of the circular cam 56, that is, the cylinder block 2 and a line segment from an axis of rotation of the circular cam 56 to the eccentric shaft 57, the cylinder block 2 is located in a lowest position when $\theta=0$, and the cylinder block 2 is located in a highest position when $\theta=180$. In the embodiment shown in FIG. 24, a range from 0 degree to 180 degrees of the link angle $\theta$ is divided into four areas A, B, C, D.

With reference to FIG. 24, the rate of change of the mechanical compression ratio $\epsilon$ in the area B has a larger absolute value than the rate of change of $\epsilon$ in the other areas A, C, D. This indicates that the mechanical compression ratio $\epsilon$ is substantially reduced in the area B when the link angle $\theta$ is slightly increased.

Meanwhile, when the input torque from the input actuator 61 is reduced abruptly, the torque that acts on the movable member 73 is increased abruptly as described above. This may cause a change in the link angle $\theta$ due to mutual rattling of components such as the wedge member 75 and the movable member 73. If the link angle $\theta$ is changed while the link angle $\theta$ being in the area B, there is a possibility that the mechanical compression ratio $\epsilon$ substantially deviates from the target value $\epsilon$T. On the other hand, if the input torque from the input actuator 61 is gradually reduced, the mechanical compression ratios $\epsilon$ does not substantially deviate from the target value $\epsilon$T.

Accordingly, in the embodiment shown in FIG. 24, a reduction rate of the input torque at the time that the torque input from the input actuator 61 is stopped is changed according to the rate of change of the mechanical compression ratio $\epsilon$. More specifically, when the link angle $\theta$ is in the area B, an absolute value of the gradient SLP (<0) is set to be small in comparison with a case where the link angle $\theta$ is in the other areas A, C, D. Thus, the input torque from the input actuator 61 is gradually reduced. As a result, the mechanical compression ratio $\epsilon$ is prevented from substantially deviating from the target value $\epsilon$T.

With reference to FIG. 24 again, the reverse input torque in the area C is larger than the reverse input torque in the other areas A, B, D. Thus, it takes longer in the area C to stop the torque input from the input actuator 61. In other words, it takes long to bring the input torque from the input actuator 61 to zero. This is because energy consumption in the input actuator 61 is large.

In view of the above, in the embodiment shown in FIG. 24, the reduction rate of the input torque at the time when the torque input from the input actuator 61 is stopped is changed according to the reverse input torque that acts on the movable member 73. More specifically, when the link angle $\theta$ is in the area C, the absolute value of the gradient SLP (<0) is set to be large in comparison with a case where the link angle $\theta$ is in the other areas A, B, D. Thus, the input torque from the input actuator 61 is abruptly reduced. As a result, the time period in which the input actuator 61 is energized is reduced, and thus the energy consumption is suppressed.

The above can be summarized as follows: in the embodiment shown in FIG. 24, the gradient SLP (<0) is set to a reference value SLPB when the link angle $\theta$ is in the areas A, D. The absolute value of the gradient SLP is set to a relatively small value SLPM when the link angle $\theta$ is in the area B, and is set to a relatively large value SLPR when the link angle $\theta$ is in the area C.

Figure 26:
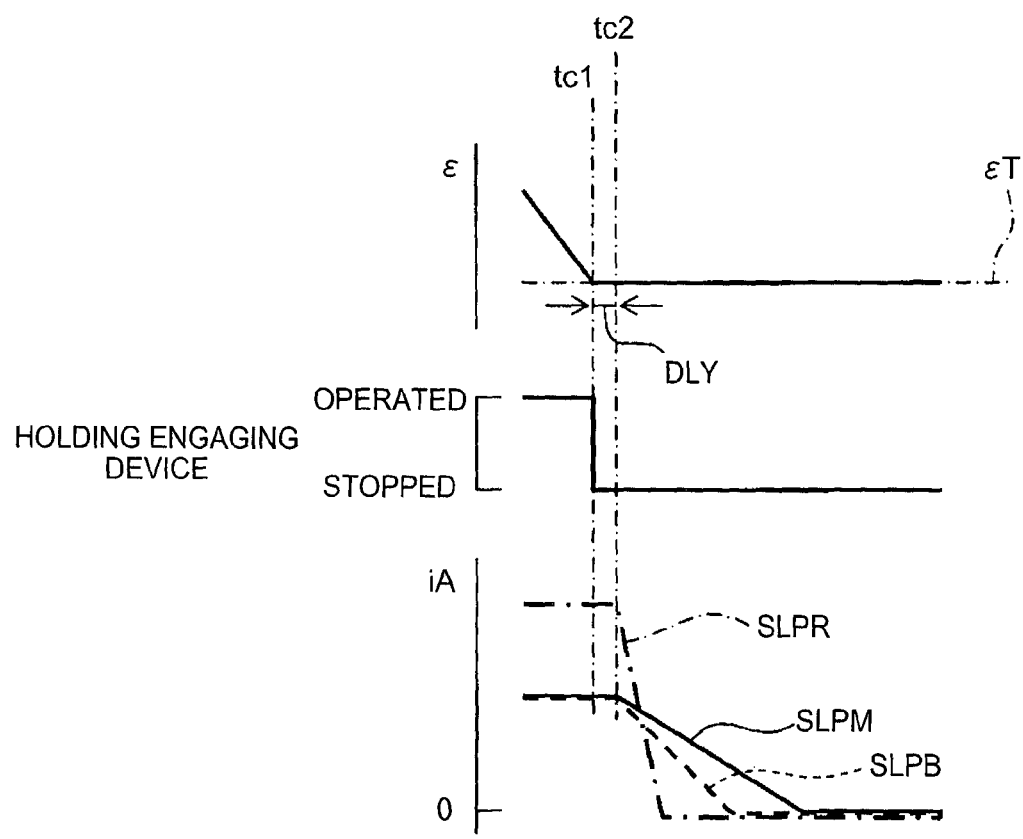
FIG. 26 is a timeline chart for describing yet another embodiment of the operation stop control of the input actuator.

In other words, as shown in FIG. 26, when the mechanical compression ratios reaches the target value $\epsilon$T at a time tc1, the operation of the holding engaging device 83 is stopped. Then, when the delay time DLY elapses at a time tc2, the energization amount iA to the input actuator 61 is gradually reduced. In this case, when the link angle $\theta$ is in the area B, the energization amount iA is gradually reduced with the gradient SLPM. Meanwhile, when the link angle $\theta$ is in the area C, the energization amount iA is abruptly reduced with the gradient SLPR.

Figure 27:
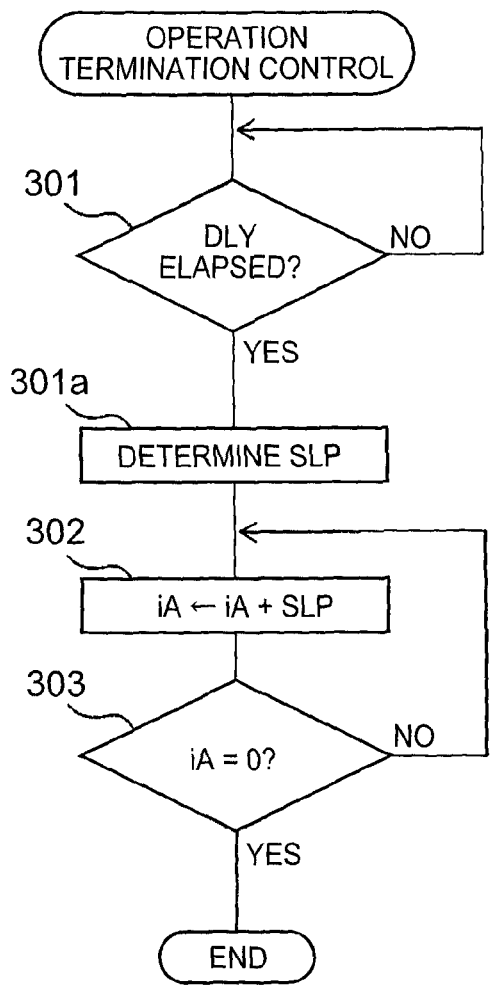
FIG. 27 is a flowchart for executing the operation stop control shown in FIG. 26.

FIG. 27 shows a routine for executing the operation stop control of the input actuator 61 that is shown in FIG. 26. It should be noted that the routine is executed in the step 109 of FIG. 15, for example. The step 109 is executed by following the step 108 in which the operation of the holding engaging device 83 is stopped.

With reference to FIG. 27, it is determined in the step 301 whether or not the delay time DLY has elapsed since the operation of the holding engaging device 83 is stopped. If the delay time DLY has not elapsed, the process returns to the step 301. If the delay time DLY has elapsed, the process proceeds to a step 301a. In the step 301a, the gradient SLP is set. In the step 302, the energization amount iA to the input actuator 61 is updated. In the step 303, it is determined whether or not the energization amount iA becomes zero. If iA=0 is not satisfied (iA>0), the process returns to the step 302, and if iA=0, the processing cycle is terminated.

Next, with reference to FIG. 28, a description will be made on another embodiment of the mechanical compression ratio control in the embodiment that is shown in FIG. 5 and FIG. 6. It should be noted that this another embodiment of the mechanical compression ratio control can also be adopted for the embodiment shown in FIG. 16, the embodiment shown in FIG. 19 and FIG. 20, and the embodiment shown in FIG. 21.

After the movable member 73 rotates in the reverse input torque acting direction R, the wedge member 75 returns from the rotation allowable area AA to the rotation prevention area PA, and then the rotation of the movable member 73 is prevented. In other words, the rotation of each of the camshafts 54, 55 is prevented. Accordingly, the mechanical compression ratio is maintained. On the other hand, when the wedge member 75 does not return from the rotation allowable area AA to the rotation prevention area PA due to damage on the compression spring 84, for example, the movable member 73 is rotated by the reverse input torque. This changes the mechanical compression ratio. In other words, the mechanical compression ratio becomes uncontrollable. In this case, the operation of the engine may not be continued.

Considering the above, it is determined whether or not the wedge member 75 has returned from the rotation allowable area AA to the rotation prevention area PA. If it is determined that the wedge member 75 has not returned from the rotation allowable area AA to the rotation prevention area PA, the moving engaging device 82 and the holding engaging device 83 are operated as shown in FIG. 28. As a result, the movable member 73 except the clearance 77 is fixed to the housing 70 via the input rotary member 78 and the moving member 79. In other words, the movable member 73 becomes unrotatable. Thus, the camshafts 54, 55 also become unrotatable, and the mechanical compression ratio is prevented from being changed. In other words, even when failure of the moving device 76 occurs, the mechanical compression ratio is prevented from being changed. Therefore, it is possible to continue the engine operation.

Whether or not the wedge member 75 has returned to the rotation prevention area PA is determined according to the relative position of the cylinder block 2 to the crankcase 1. The relative position of the cylinder block 2 to the crankcase 1 is detected by the position sensor 43 (FIG. 1). In other words, if the relative position of the cylinder block 2 to the crankcase 1 does not change after the operation stop of the input actuator 61, it is determined that the wedge member 75 has returned to the rotation prevention area PA. On the other hand, if the relative position of the cylinder block 2 to the crankcase 1 changes after the operation stop of the input actuator 61, it is determined that the wedge member 75 has not returned to the rotation prevention area PA. Alternatively, in the variable compression ratio mechanism that is provided with a sensor for detecting the rotation of the output shaft of the input actuator 61, it is possible to determine that the wedge member 75 has not returned to the rotation prevention area PA when the output shaft of the input actuator 61 rotates after the mechanical compression ratio reaches the target value and the operation of the input actuator 61 is stopped. Furthermore, in the variable compression ratio mechanism in which the input actuator 61 is operated to maintain the mechanical compression ratio at the target value, even in a case where the wedge member 75 is located in the rotation prevention area PA, it is possible to determine that the wedge member 75 has not returned to the rotation prevention area PA when the input actuator 61 is operated again after the mechanical compression ratio reaches the target value and the operation of the input actuator 61 is stopped.

Figure 28:
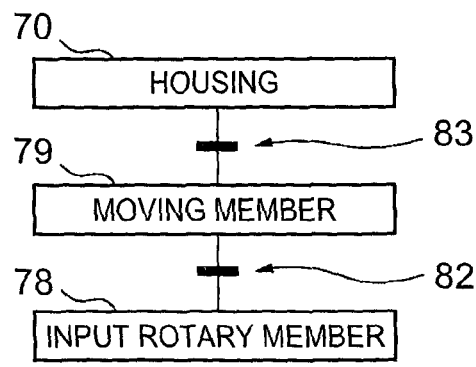
FIG. 28 is a view for illustrating another embodiment of the mechanical compression ratio control.
Figure 29:
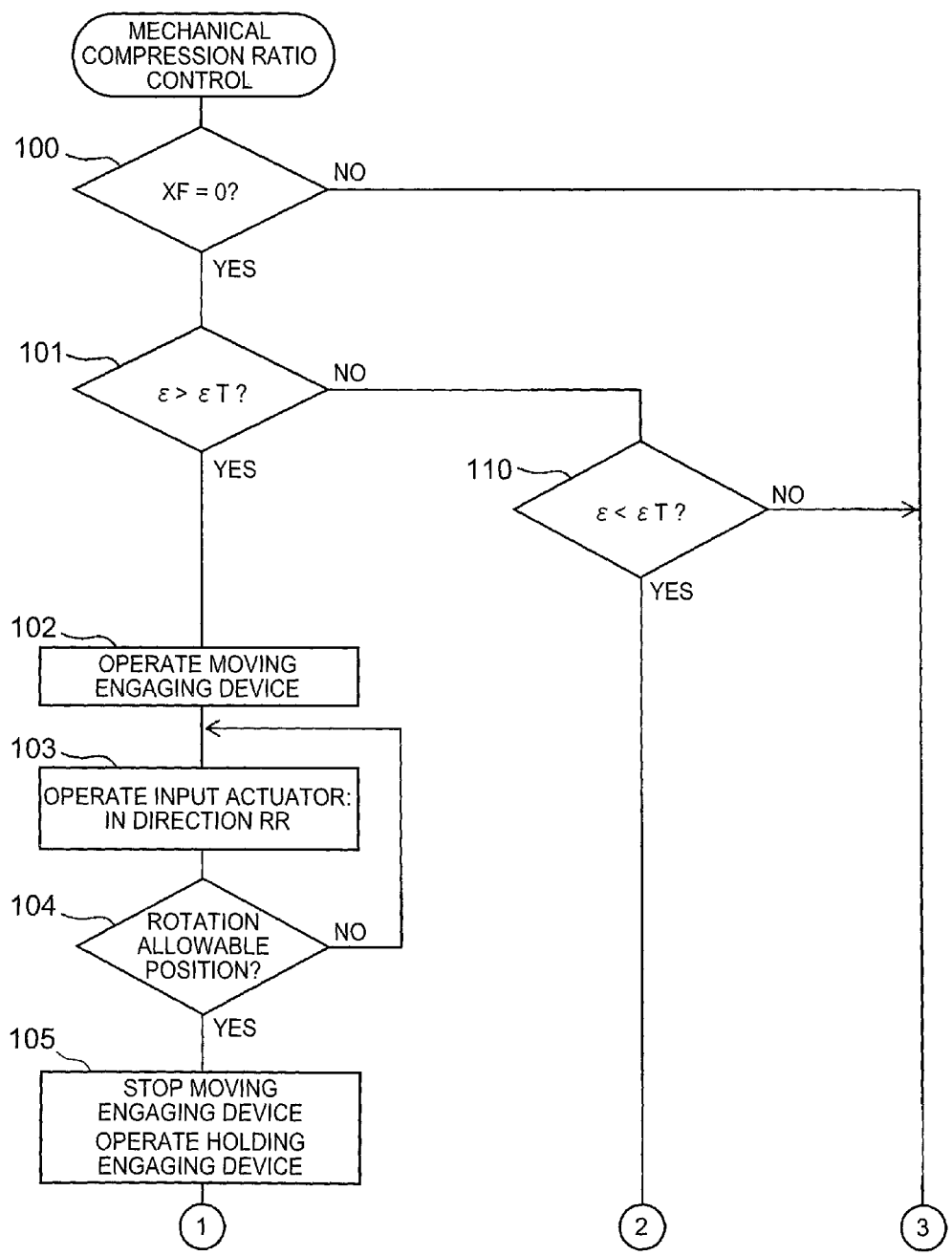
FIG. 29 is a flowchart for executing the mechanical compression ratio control shown in FIG. 28.
Figure 30:
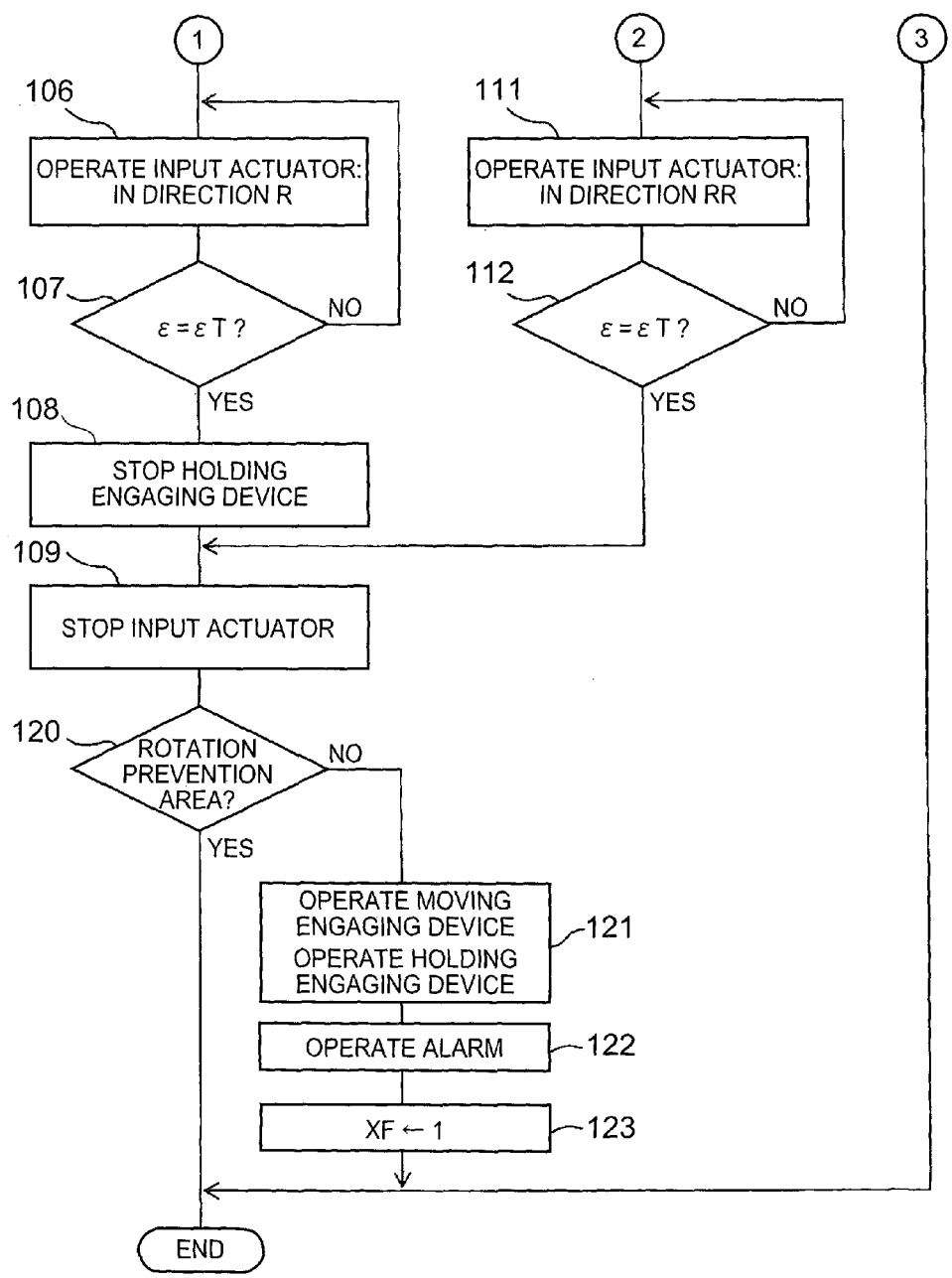
FIG. 30 is a flowchart for executing the mechanical compression ratio control shown in FIG. 28.

FIG. 29 and FIG. 30 show a routine for executing the mechanical compression ratio control in the embodiment that is shown in FIG. 28.

With reference to FIG. 29 and FIG. 30, it is determined in the step 100 whether or not a flag XF is set. The flag XF is set when the reverse input torque cutoff clutch 62 does not work (XF=1) and is reset (XF=0) when the reverse input torque cutoff clutch 62 works. When the flag XF is reset, the process proceeds to the step 101. Because the routine from the step 101 to the step 109 is the same as that shown in FIG. 14 and FIG. 15, the description thereof is not repeated. When the flag XF is set, the processing cycle is terminated.

In a step 120 following the step 109, it is determined whether or not the wedge member 75 has returned to the rotation prevention area PA. If it is determined that the wedge member 75 has returned to the rotation prevention area PA, the processing cycle is terminated. If it is determined that the wedge member 75 has not returned to the rotation prevention area PA, the process proceeds to a step 121, and then the moving engaging device 82 and the holding engaging device 83 are operated. In a next step 122, the alarm 44 (FIG. 1) is operated. In a next step 123, the flag XF is set.

Figure 31:
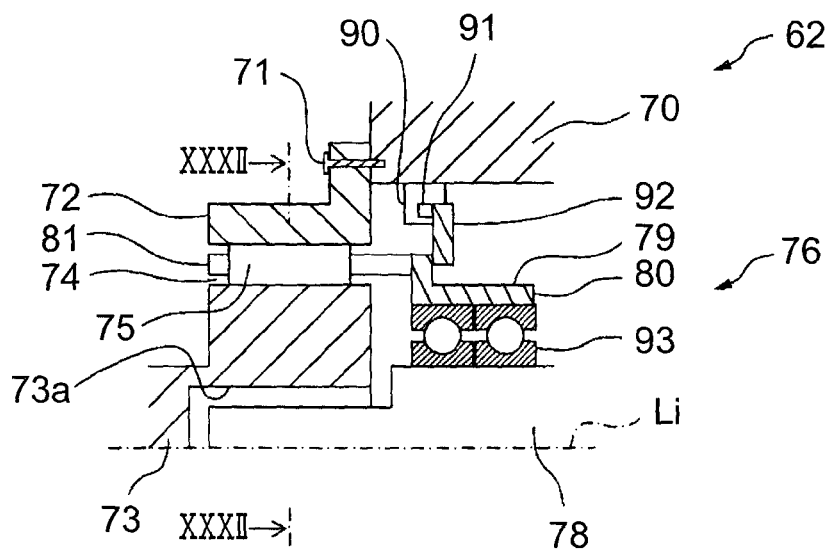
FIG. 31 is a partial cross-sectional view for showing yet another embodiment of the reverse input torque cutoff clutch.
Figure 32:
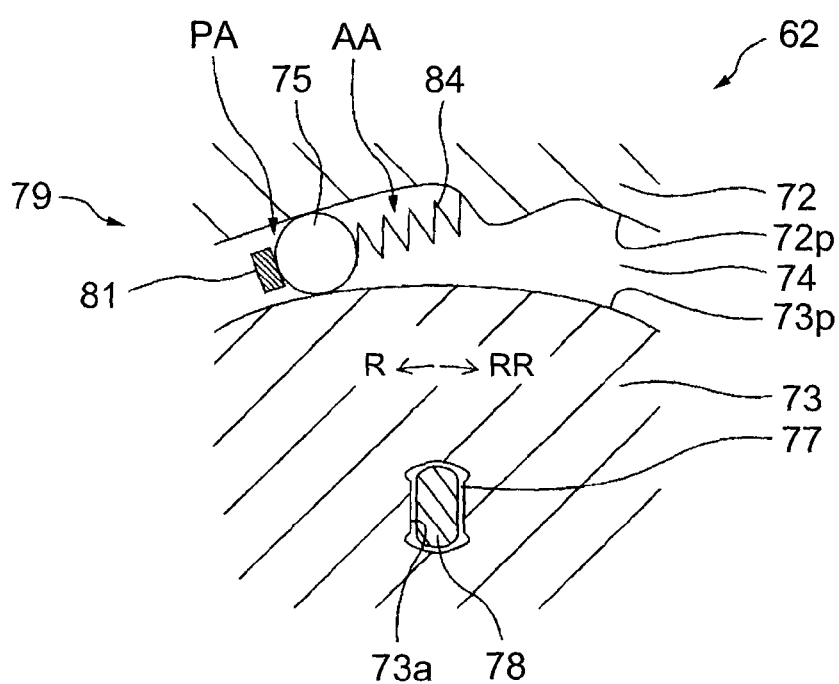
FIG. 32 is a partial cross-sectional view taken along the line XXXII-XXXII of FIG. 31.

FIG. 31 and FIG. 32 show yet another embodiment of the reverse input torque cutoff clutch 62. A description will hereinafter be made on differences from the embodiment that is shown in FIG. 5 and FIG. 6.

In the embodiment shown in FIG. 31 and FIG. 32, the moving device 76 includes a moving actuator 90 that is different from the input actuator 61. The moving actuator 90 moves the wedge member 75 from the rotation prevention area PA to the rotation allowable area AA. In other words, the input actuator 61 is not operated to move the wedge member 75 to the rotation allowable area AA. The moving actuator 90 includes an extension member 91 that is extensible.

Figure 33:
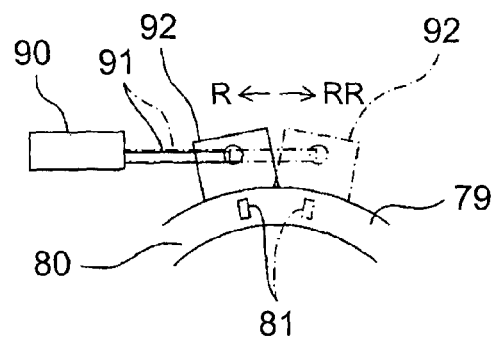
FIG. 33 is a view for illustrating an action of a moving actuator.

Meanwhile, a projecting section 92 is formed in the annular member 80 of the moving member 79. The extension member 91 of the moving actuator 90 is connected to the projecting section 92. In the embodiment shown in FIG. 31 and FIG. 32, the moving member 79 rotates in the reverse direction RR when the extension member 91 is extended, and the moving member 79 rotates in the reverse input torque acting direction R when the extension member 91 is contracted as shown in FIG. 33. The moving actuator 90 is formed of an electromagnetic solenoid, for example. The extension member 91 is extended when the electromagnetic solenoid is energized. Then, the extension member 91 is contracted when energization to the electromagnetic solenoid is stopped. It should be noted that a reference numeral 93 in FIG. 31 represents a bearing for holding the moving member 79 in the rotatable manner.

When the movable member 73 rotates in the reverse input torque acting direction R to reduce the mechanical compression ratio, the moving actuator 90 is energized, and then the extension member 91 is extended. As a result, the moving member 79 rotates in the reverse direction RR, and the wedge member 75 moves from the rotation prevention area PA to the rotation allowable area AA in the reverse direction RR. Because the extension member 91 continues to be extended, the wedge member 75 is held in the rotation allowable area AA. In a state where the wedge member 75 is held in the rotation allowable area AA, the input actuator 61 is driven to rotate in the reverse input torque acting direction R. Accordingly, the movable member 73 rotates in the reverse input torque acting direction R. Therefore, the mechanical compression ratio is changed.

Once the mechanical compression ratio reaches the target value, the operation of the input actuator 61 is stopped. In addition, the energization to the moving actuator 90 is also stopped, and the extension member 91 is contracted. As a result, the wedge member 75, together with the moving member 79, rotates in the reverse input torque acting direction R by the compression spring 84 and returns to the rotation prevention area PA. Accordingly, the mechanical compression ratio is maintained.

Figure 34:
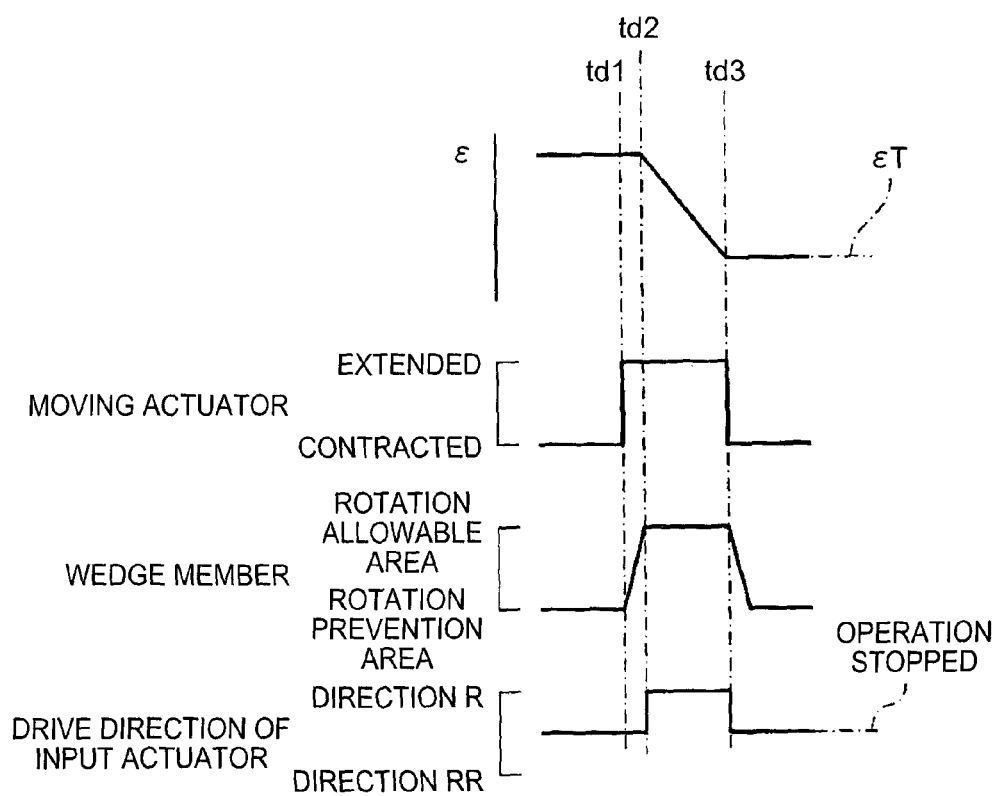
FIG. 34 is a timeline chart for describing the mechanical compression ratio control in the embodiment shown in FIG. 31 and FIG. 32.

In other words, in FIG. 34, when the mechanical compression ratio $\epsilon$ is to be reduced, the extension member 91 of the moving actuator 90 is extended at a time td1. As a result, the moving member 79 rotates in the reverse direction RR, and the wedge member 75 moves in the reverse direction RR. Next, when the wedge member 75 moves to the rotation allowable area AA at a time td2, the input actuator 61 rotates in the reverse input torque acting direction R. As a result, the mechanical compression ratio $\epsilon$ is reduced. Then, when the mechanical compression ratio $\epsilon$ becomes the target value $\epsilon T$ at a time td3, the extension member 91 is contracted, and the wedge member 75 returns to the rotation prevention area PA by the compression spring 84. In addition, the rotation of the input actuator 61 is stopped.

Figure 35:
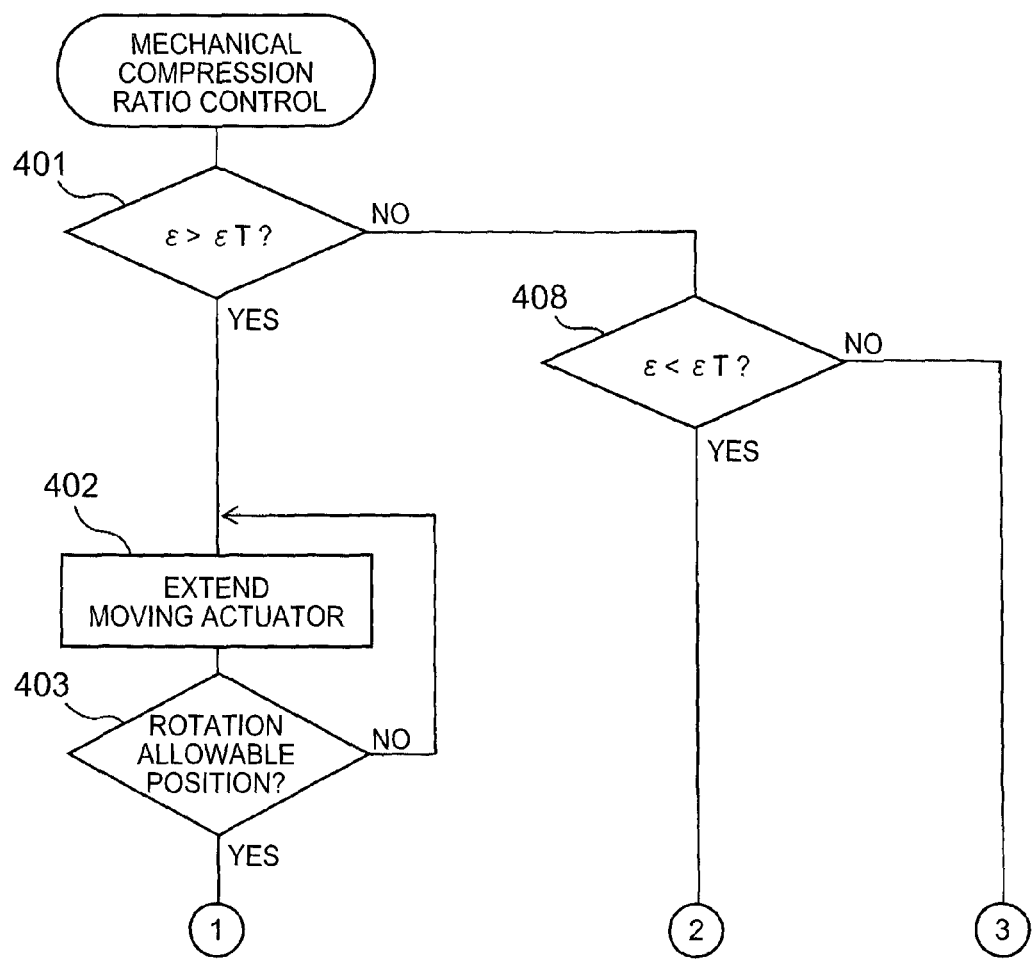
FIG. 35 is a flowchart for executing the mechanical compression ratio control shown in FIG. 34.
Figure 36:
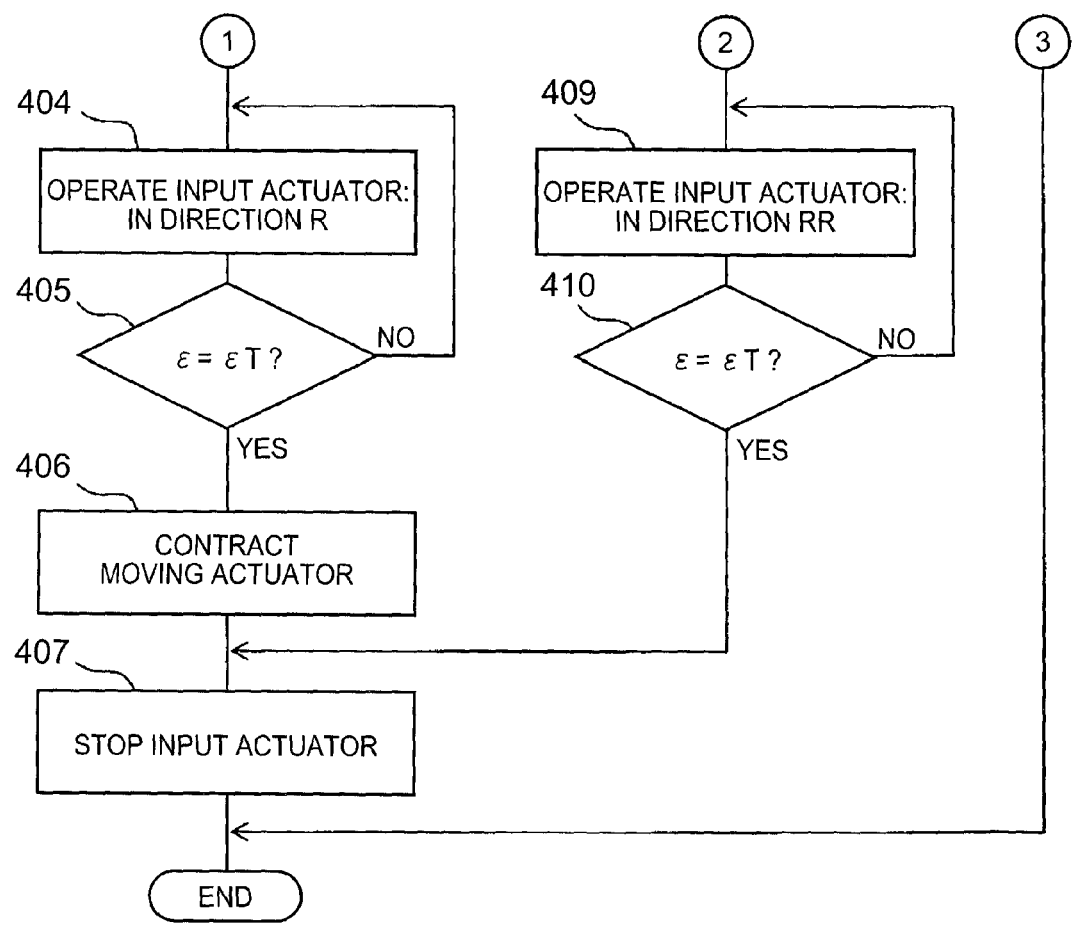
FIG. 36 is a flowchart for executing the mechanical compression ratio control shown in FIG. 34.

FIG. 35 and FIG. 36 show a routine for executing the mechanical compression ratio control in the embodiment that is shown in FIG. 31 and FIG. 32.

With reference to FIG. 35 and FIG. 36, it is determined in a step 401 whether or not the current mechanical compression ratio $\epsilon$ is larger than the target value $\epsilon T$. If $\epsilon > \epsilon T$, that is, in order to reduce the mechanical compression ratio $\epsilon$, the process proceeds to a step 402. In the step 402, the extension member 91 of the moving actuator 90 is extended, and the moving member 79 rotates in the reverse direction RR. In a next step 403, it is determined whether or not the wedge member 75 has moved to the rotation allowable area AA. If the wedge member 75 has not moved to the rotation allowable area AA, the process returns to the step 402. If the wedge member 75 has moved to the rotation allowable area AA, the process proceeds to a step 404. At this time, the extension member 91 continues to be extended, and the wedge member 75 is held in the rotation allowable area AA. In the step 404, the input actuator 61 is operated to rotate the movable member 73 in the reverse input torque acting direction R. As a result, the mechanical compression ratio $\epsilon$ is reduced. In a next step 405, it is determined whether or not the current mechanical compression ratio $\epsilon$ becomes equal to the target value $\epsilon T$. If $\epsilon = \epsilon T$ is not satisfied ($\epsilon > \epsilon T$), the process returns to the step 404. If $\epsilon = \epsilon T$, the process proceeds to a step 406, and the extension member 91 is contracted. As a result, the wedge member 75 returns to the rotation prevention area PA by the compression spring 84. In a next step 407, the operation of the input actuator 61 is stopped.

If $\epsilon > \epsilon T$ is not satisfied ($\epsilon \leq \epsilon T$) in the step 401, the process proceeds to a step 408. In the step 408, it is determined whether or not the current mechanical compression ratio $\epsilon$ is smaller than the target value $\epsilon T$. If $\epsilon < \epsilon T$, that is, if the mechanical compression ratio $\epsilon$ is increased, the process proceeds to a step 409. In the step 409, the input actuator 61 is operated to rotate the movable member 73 in the reverse direction RR. In a next step 410, it is determined whether or not the current mechanical compression ratio $\epsilon$ becomes equal to the target value $\epsilon T$. If $\epsilon = \epsilon T$ is not satisfied ($\epsilon < \epsilon T$), the process returns to the step 409. If $\epsilon = \epsilon T$, the process proceeds to the step 407.

If $\epsilon = \epsilon T$ in the step 408, the processing cycle is terminated.

In the embodiment shown in FIG. 31 and FIG. 32, the input rotary member 78 does not rotate in order to move the wedge member 75 from the rotation prevention area PA to the rotation allowable area AA. Thus, there is no need to provide clearance between the movable member 73 and the input rotary member 78. In the embodiment shown in FIG. 31 and FIG. 32, it is possible to integrally form the movable member 73 and the input rotary member 78. In addition, the operation stop control of the input actuator 61 that is shown in FIG. 22 or FIG. 26 can be adopted for the embodiment that is shown in FIG. 31 and FIG. 32.

Figure 37:
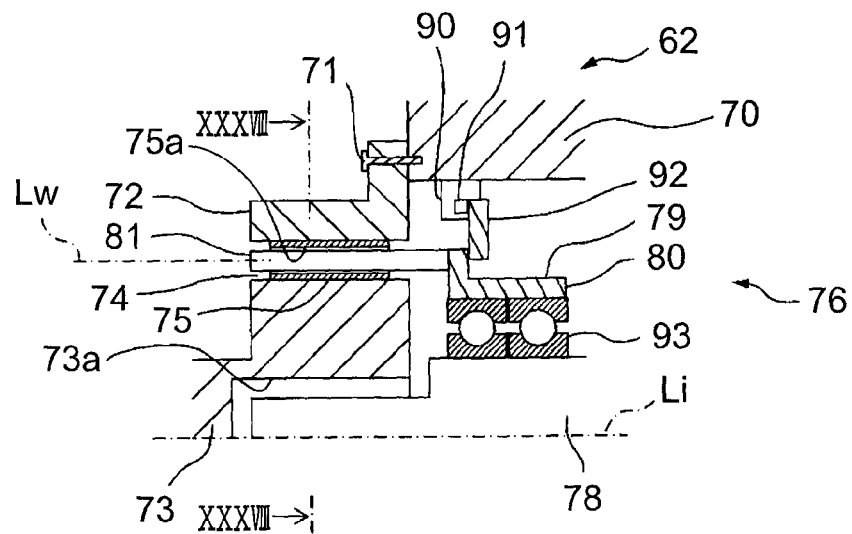
FIG. 37 is a partial cross-sectional view for showing yet another embodiment of the reverse input torque cutoff clutch.
Figure 38:
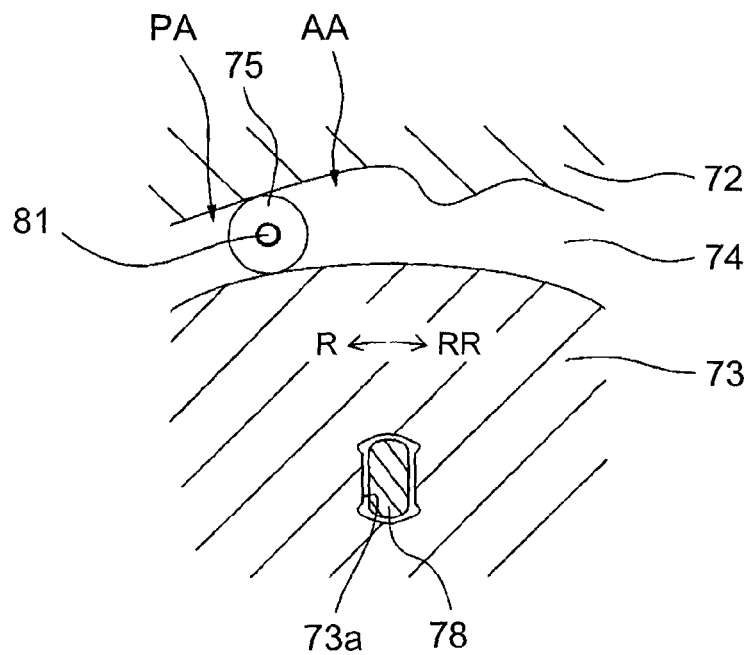
FIG. 38 is a partial cross-sectional view taken along the line XXXVIII-XXXVIII of FIG. 37.

FIG. 37 and FIG. 38 show yet another embodiment of the reverse input torque cutoff clutch 62. A description will hereinafter be made on differences from the embodiment that is shown in FIG. 31 and FIG. 32.

In the embodiment shown in FIG. 37 and FIG. 38, a receiving hole 75a that extends in an axis Lw direction is formed at the center of the wedge member 75. The receiving hole 75a receives the rod member 81 of the moving member 79. Thus, the wedge member 75 is held by the rod member 81 to be rotatable about the axis Lw. It should be noted that the compression spring to urge the wedge member 75 to the rotation prevention area PA is not provided in this embodiment. The compression spring 84 serving as the urging member in the embodiments can be replaced with an elastic member such as rubber and any other means for urging the wedge portion.

When the movable member 73 rotates in the reverse input torque acting direction R to reduce the mechanical compression ratio, the extension member 91 is extended. As a result, the moving member 79 rotates in the reverse direction RR, and the wedge member 75 moves from the rotation prevention area PA to the rotation allowable area AA in the reverse direction RR. Because the extension member 91 continues to be extended, the wedge member 75 is held in the rotation allowable area AA. In the state where the wedge member 75 is held in the rotation allowable area AA, the input actuator 61 is driven to rotate in the reverse input torque acting direction R. Accordingly, the movable member 73 rotates in the reverse input torque acting direction R. Therefore, the mechanical compression ratio is changed.

Once the mechanical compression ratio becomes the target value, the operation of the input actuator 61 is stopped. In addition, the extension member 91 is contracted. As a result, the wedge member 75 rotates in the reverse input torque acting direction R together with the moving member 79 and returns to the rotation prevention area PA. Therefore, the mechanical compression ratio is maintained.

Figure 39:
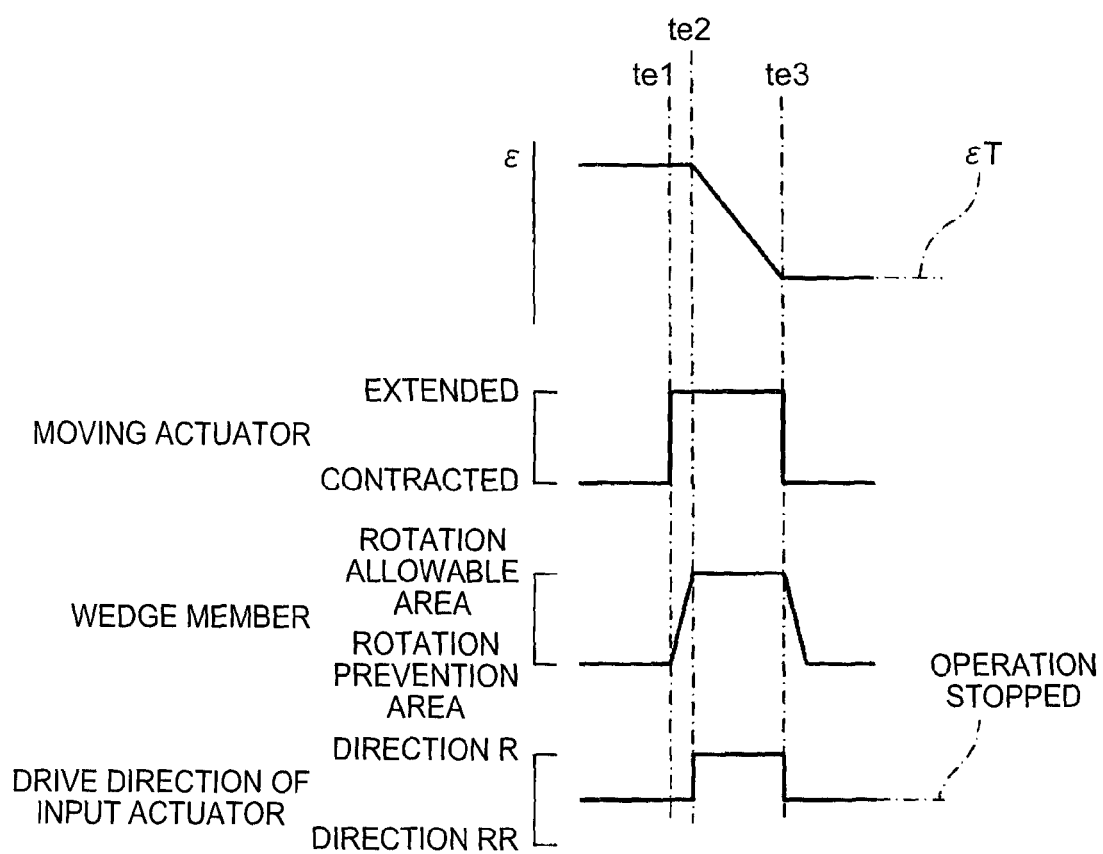
FIG. 39 is a timeline chart for describing the mechanical compression ratio control in the embodiment shown in FIG. 37 and FIG. 38.

In other words, when the mechanical compression ratio $\epsilon$ is reduced in a timeline chart of FIG. 39, the extension member 91 of the moving actuator 90 is extended at a time te1. As a result, the moving member 79 rotates in the reverse direction RR, and the wedge member 75 moves in the reverse direction RR. Next, when the wedge member 75 moves to the rotation allowable area AA at a time te2, the input actuator 61 rotates in the reverse input torque acting direction R. As a result, the mechanical compression ratio $\epsilon$ is reduced. Then, when the mechanical compression ratio $\epsilon$ becomes the target value $\epsilon T$ at a time te3, the extension member 91 is contracted. Accordingly, the wedge member 75 returns to the rotation prevention area PA. In addition, the rotation of the input actuator 61 is stopped.

Thus, after the movable member 73 rotates in the reverse input torque acting direction R, the moving actuator 90 returns the wedge member 75 from the rotation allowable area AA to the rotation prevention area PA.

When the wedge member 75 moves between the rotation prevention area PA and the rotation allowable area AA, the wedge member 75 rotates about the axis Lw (FIG. 37) and thus can roll on the movable member 73. As a result, the wedge member 75 can move easily.

Figure 40:
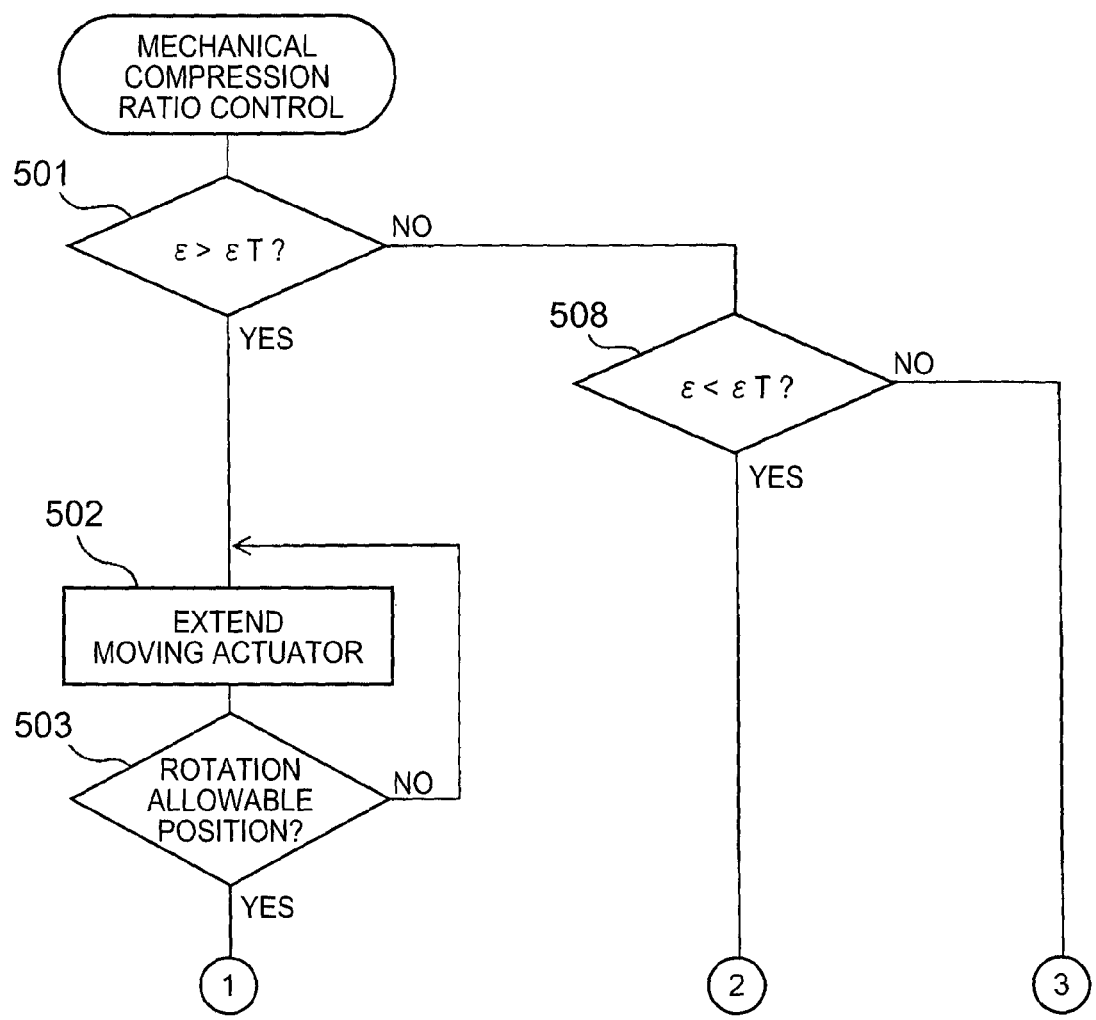
FIG. 40 is a flowchart for executing the mechanical compression ratio control in the embodiment shown in FIG. 37 and FIG. 38.
Figure 41:
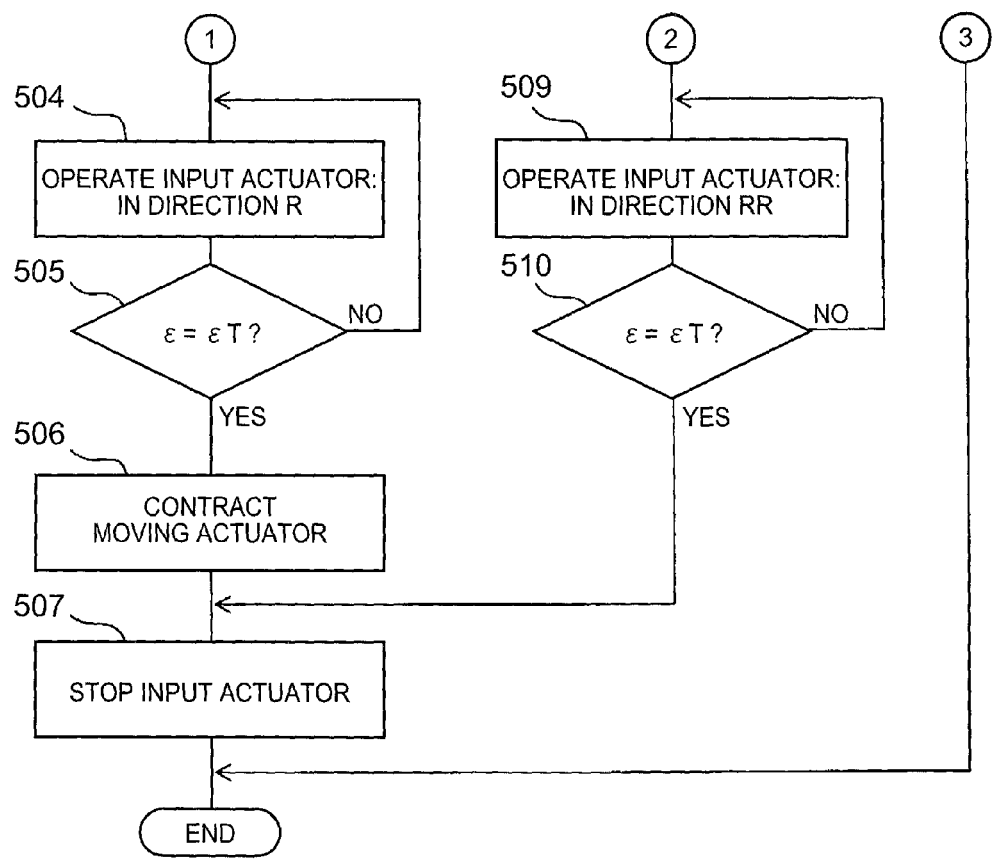
FIG. 41 is a flowchart for executing the mechanical compression ratio control in the embodiment shown in FIG. 37 and FIG. 38.

FIG. 40 and FIG. 41 show a routine for executing the mechanical compression ratio control in the embodiment that is shown in FIG. 37 and FIG. 38.

With reference to FIG. 40 and FIG. 41, it is determined in a step 501 whether or not the current mechanical compression ratio $\epsilon$ is larger than the target value $\epsilon T$. If $\epsilon > \epsilon T$, that is, in order to reduce the mechanical compression ratio $\epsilon$, the process proceeds to a step 502, the extension member 91 is extended, and the moving member 79 rotates in the reverse direction RR. In a next step 503, it is determined whether or not the wedge member 75 has moved to the rotation allowable area AA. If the wedge member 75 has not moved to the rotation allowable area AA, the process returns to the step 502. If the wedge member 75 has moved to the rotation allowable area AA, the process proceeds to a step 504. At this time, the extension member 91 continues to be extended, and the wedge member 75 is held in the rotation allowable area AA. In the step 504, the input actuator 61 is operated such that the movable member 73 rotates in the reverse input torque acting direction R. As a result, the mechanical compression ratio $\epsilon$ is reduced. In a next step 505, it is determined whether or not the current mechanical compression ratio $\epsilon$ becomes equal to the target value $\epsilon T$. If $\epsilon = \epsilon T$ is not satisfied ($\epsilon > \epsilon T$), the process returns to the step 504. If $\epsilon = \epsilon T$, the process proceeds to a step 506, and the extension member 91 is contracted. As a result, the wedge member 75 returns to the rotation prevention area PA. In a next step 507, the operation of the input actuator 61 is stopped.

If $\epsilon > \epsilon T$ is not satisfied ($\epsilon \leq \epsilon T$) in the step 501, the process proceeds to a step 508. In the step 508, it is determined whether or not the current mechanical compression ratio $\epsilon$ is smaller than the target value $\epsilon T$. If $\epsilon < \epsilon T$, that is, in order to increase the mechanical compression ratio $\epsilon$, the process proceeds to a step 509. In the step 509, the input actuator 61 is operated such that the movable member 73 rotates in the reverse direction RR. In a next step 510, it is determined whether or not the current mechanical compression ratio $\epsilon$ becomes equal to the target value $\epsilon T$. If $\epsilon = \epsilon T$ is not satisfied ($\epsilon < \epsilon T$), the process returns to the step 509. If $\epsilon = \epsilon T$, the process proceeds to the step 507, and the operation of the input actuator is stopped.

If $\epsilon < \epsilon T$ is not satisfied ($\epsilon = \epsilon T$) in the step 508, the processing cycle is terminated.

While the disclosure has been explained in conjunction with specific exemplary embodiments thereof, it is evident that many alternatives, modifications, and variations will be apparent to those skilled in the art. Accordingly, exemplary embodiments of the disclosure as set forth herein are intended to be illustrative, not limiting. There are changes that may be made without departing from the scope of the disclosure.

The invention claimed is:

1. An internal combustion engine comprising:
a variable compression ratio mechanism that changes a mechanical compression ratio, wherein
the variable compression ratio mechanism includes:
  a pair of camshafts;
  an input actuator that generates input torque to move the operation element; and
  a reverse input torque cutoff clutch that is disposed between an output shaft of the input actuator and the pair of camshafts in order to transmit the input torque from the input actuator to the pair of camshafts and to cut off reverse input torque from the pair of camshafts to the input actuator, and
the variable compression ratio mechanism changes the mechanical compression ratio by moving the pair of camshafts, and
the reverse input torque cutoff clutch includes:
  a fixed member;
  a movable member that is rotatable with respect to the fixed member;
  annular clearance that is defined by a peripheral surface of the fixed member and a peripheral surface of the movable member;
  a wedge member that is movably disposed in the clearance; and
  a moving device that includes the input actuator to move the wedge member in the clearance, a moving engaging device that engages the wedge member with the output shaft of the input actuator, a holding engaging device that can engage the wedge member with the fixed member, and an urging member that urges the wedge member from the rotation allowable area to the rotation prevention area,
the output shaft of the input actuator and the pair of camshafts are connected to the movable member,
the peripheral surface of the fixed member is formed such that the clearance is formed with:
  a rotation prevention area that prevents the movable member from rotating in the reverse input torque acting direction when the wedge member abuts against the fixed member and the movable member; and
  a rotation allowable area that allows the movable member to rotate in the reverse input torque acting direction,
the rotation prevention area is located on a downstream side of the rotation allowable area in the reverse input torque acting direction, and when the movable member moves in the reverse input torque acting direction to change the mechanical compression ratio, the moving device moves the wedge member from the rotation prevention area to the rotation allowable area in an opposite direction from the reverse input torque acting direction and holds the wedge member in the rotation allowable area, and the input actuator rotates the movable member in the reverse input torque acting direction,
wherein the urging member is a spring, and
wherein the holding engaging device includes a coil spring that is disposed around the moving member.

2. The internal combustion engine according to claim 1, wherein the moving device returns the wedge member from the rotation allowable area to the rotation prevention area after the movable member rotates in the reverse input torque acting direction.

3. The internal combustion engine according to claim 2, wherein
the moving engaging device engages the wedge member with the output shaft of the input actuator,
and when the wedge member is held in the rotation allowable area, the holding engaging device engages the wedge member with the fixed member,
and the urging member returns the wedge member from the rotation allowable area to the rotation prevention area after the movable member rotates in the reverse input torque acting direction, and
the moving engaging device engages the wedge member with the output shaft of the input actuator and the holding engaging device engages the wedge member with the fixed member when the wedge member has not returned from the rotation allowable area to the rotation prevention area, and the moving device prevents the rotation of the movable member to maintain the mechanical compression ratio.

4. The internal combustion engine according to claim 2, wherein
torque input from the input actuator is stopped after the moving device returns the wedge member from the rotation allowable area to the rotation prevention area.

5. The internal combustion engine according to claim 1, wherein
the input actuator moves the wedge member from the rotation prevention area to the rotation allowable area.

6. The internal combustion engine according to claim 5, wherein
the moving engaging device engages the wedge member with the output shaft of the input actuator.

7. The internal combustion engine according to claim 5, wherein
when the wedge member is held in the rotation allowable area, the holding engaging device engages the wedge member with the fixed member.

8. The internal combustion engine according to claim 5, wherein
and the urging member returns the wedge member from the rotation allowable area to the rotation prevention area after the movable member rotates in the reverse input torque acting direction.

9. The internal combustion engine according to claim 5, wherein
the output shaft of the input actuator is connected to the movable member with clearance in a rotational direction, and the input actuator moves the wedge member from the rotation prevention area to the rotation allowable area without rotating the movable member in an opposite direction from the reverse input torque acting direction.

10. The internal combustion engine according to claim 1, wherein
the moving device further includes a moving actuator, and the moving actuator moves the wedge member from the rotation prevention area to the rotation allowable area.

11. The internal combustion engine according to claim 10, wherein
the moving actuator holds the wedge member in the rotation allowable area.

12. The internal combustion engine according to claim 10, wherein
the urging member returns the wedge member from the rotation allowable area to the rotation prevention area after the movable member rotates in the reverse input torque acting direction.

13. The internal combustion engine according to claim 10, wherein
the moving actuator returns the wedge member from the rotation allowable area to the rotation prevention area after the movable member rotates in the reverse input torque acting direction.

14. The internal combustion engine according to claim 1, wherein
when torque input from the input actuator is stopped, the input torque from the input actuator is gradually reduced.

15. The internal combustion engine according to claim 14, wherein
a reduction rate of the input torque from the input actuator is changed according to a rate of change of the mechanical compression ratio.

16. The internal combustion engine according to claim 14, wherein
a reduction rate of the input torque from the input actuator is changed according to the reverse input torque that acts on the movable member.

* * * * *